US008448233B2

(12) United States Patent
Shulman et al.

(10) Patent No.: US 8,448,233 B2
(45) Date of Patent: May 21, 2013

(54) DEALING WITH WEB ATTACKS USING CRYPTOGRAPHICALLY SIGNED HTTP COOKIES

(75) Inventors: Amichai Shulman, Tel Aviv (IL); Tal Arieh Be'ery, Petach Tikva (IL)

(73) Assignee: Imperva, Inc., Redwood Shores, CA (US)

( * ) Notice: Subject to any disclaimer, the term of this patent is extended or adjusted under 35 U.S.C. 154(b) by 35 days.

(21) Appl. No.: 13/218,421

(22) Filed: Aug. 25, 2011

(65) Prior Publication Data

US 2013/0055384 A1  Feb. 28, 2013

(51) Int. Cl.
*H04L 29/06* (2006.01)
*G06F 15/16* (2006.01)

(52) U.S. Cl.
USPC ......... 726/12; 726/1; 726/5; 726/22; 713/176

(58) Field of Classification Search
None
See application file for complete search history.

(56) References Cited

U.S. PATENT DOCUMENTS

| | | | |
|---|---|---|---|
| 6,311,278 | B1 | 10/2001 | Raanan et al. |
| 7,234,060 | B1* | 6/2007 | Amdur et al. ............... 713/176 |
| 7,472,413 | B1 | 12/2008 | Mowshowitz |
| 7,580,919 | B1* | 8/2009 | Hannel et al. ........................ 1/1 |
| 7,908,649 | B1* | 3/2011 | Arora et al. ...................... 726/7 |
| 7,950,055 | B2* | 5/2011 | Blinn et al. ...................... 726/21 |
| 7,954,144 | B1* | 5/2011 | Ebrahimi et al. .............. 726/12 |
| 8,219,802 | B2* | 7/2012 | Doleh et al. ................... 713/155 |
| 2004/0187024 | A1* | 9/2004 | Briscoe et al. ................ 713/201 |
| 2005/0204041 | A1* | 9/2005 | Blinn et al. ................... 709/225 |
| 2006/0272008 | A1 | 11/2006 | Shulman et al. |
| 2010/0042735 | A1* | 2/2010 | Blinn et al. ................... 709/229 |
| 2010/0107234 | A1* | 4/2010 | Aldor et al. ...................... 726/9 |
| 2011/0138179 | A1* | 6/2011 | Jiang et al. ................... 713/168 |
| 2011/0154488 | A1* | 6/2011 | Rajan et al. ................... 726/22 |
| 2011/0320616 | A1* | 12/2011 | Wray ............................. 709/228 |
| 2011/0320820 | A1* | 12/2011 | Wray ............................. 713/176 |
| 2012/0096271 | A1* | 4/2012 | Ramarathinam et al. ...... 713/172 |
| 2012/0151568 | A1* | 6/2012 | Pieczul et al. ..................... 726/8 |
| 2012/0291141 | A1* | 11/2012 | Doleh et al. ..................... 726/28 |

OTHER PUBLICATIONS

Robinson et al, "The Common Gateway Interface (CGI) Version 1.1", Oct. 2004, Network Working Group Request for Comments: 3875, p. 1-32.*

(Continued)

*Primary Examiner* — Christopher Revak

(74) *Attorney, Agent, or Firm* — Blakely Sokoloff Taylor & Zafman, LLP

(57) ABSTRACT

According to one embodiment, a security gateway (SG) is coupled between a hypertext transport protocol (HTTP) client and a web application server. Responsive to a first HTTP message being transmitted between the HTTP client and the web application server as part of an HTTP session, the SG generates security gateway session security state information (SGI) based on a policy. The SG also generates a digital signature (SGS) from the SGI, creates an SG signed session security state information cookie (SGC), and sends the SGC to the HTTP client for storage instead of storing the SGI in the SG. Responsive to a second HTTP message of the HTTP session, the SG attempts to validate a claim made in the second HTTP request using at least the policy and the SGC that is supposed to be returned with the second HTTP message.

73 Claims, 15 Drawing Sheets

OTHER PUBLICATIONS

"Automated Learning of Applications and User Behavior, Web Application Firewall (WAF)—Real Time Protection from Web Attacks", 4 pages, downloaded from http://www.imperva.com/products/wsc_web-application-firewall.html on Dec. 1, 2010, Imperva.

"Cookie Poisoning", 3 pages, downloaded from http://www.imperva.com/resources/glossary/cookie_poisoning.html on Dec. 1, 2010, Imperva.

"Digital Signature", 9 pages, downloaded from http://en.wikipedia,org/wiki/Digital_signature on Dec. 1, 2010, Wikipedia.

"Forceful Browsing", 3 pages, downloaded from http://www.imperva.com/resources/glossary/forceful_browsing.html on Dec. 1, 2010, Imperva.

"Monitor and Protect Critical Web Applications, Imperva SecureSphere Web Application Security Products", 3 pages, downloaded from http://www.imperva.com/products/wsc_web-security-and-compliance-overview.html on Dec. 1, 2010, Imperva.

"Next Generation Web Application Firewalls: NG-WAF, White Paper", 2010, 16 pages, Imperva, Redwood Shores, CA.

"Parameter Tampering", 3 pages, downloaded from http://www.imperva.com/resources/glossary/parameter_tampering.html on Dec. 1, 2010, Imperva.

"SecureSphere and OWASP 2010 Top Ten Most Critical Web Application Security Risks", Imperva Technical Brief, 2010, 6 pages, Imperva, Redwood Shores, CA.

"State-Based Attacks", Chapter 4, Jan. 12, 2006, pp. 41-64, Whittaker_04i.qxd.

"The SecureSpere Web Application Firewall, An Accurate and Effective Approach to Protecting and Monitoring Web Applications", 2008, 12 pages, Imperva, Redwood Shores, CA.

"Web Application Firewall (WAF)—Real Time Protection from Web Attacks", 2010, 2 pages, downloaded from http://www.imperva.com/products/wsc_web-application-firewall.html on Dec. 1, 2010, Imperva.

"Web Application Security, Protect Your Critical Web Applications", 2010, 4 pages, Imperva, Redwood Shores, CA.

\* cited by examiner

POLICIES 150

| TYPE 151 | INFORMATION (REFERRED TO AS CREATION TRIGGER INFORMATION 155) THAT WHEN PRESENT IN HTTP REQUESTS/RESPONSES CAUSE THE CREATION OF SGI(S) | INFORMATION (REFERRED TO AS REGENERATION TRIGGER INFORMATION 156) THAT WHEN PRESENT IN HTTP REQUESTS CAUSE REGENERATION OF CORRESPONDING EXPECTED DIGITAL SIGNATURES (SGS'(S)) |
|---|---|---|
| PARAMETER TAMPERING (ENFORCING READ ONLY PARAMETERS) 152 | NAME OF PARAMETER [AND URL, WHERE URL CAN BE *] 191 IN HTTP RESPONSE | NAME OF PARAMETER [AND URL, WHERE URL CAN BE *] 191 |
| FORCEFUL BROWSING (ENFORCING APPLICATION FLOW) 153 | PREREQUISITE URL 192 IN HTTP REQUEST | URL REQUIRING PREREQUISITE 193 |
| COOKIE POISONING (DETECTING COOKIE POISONING) 154 | SET COOKIE COMMAND WITH A WEB APPLICATION COOKIE NAME 194 IN HTTP RESPONSE | WEB APPLICATION COOKIE NAME 194 |

FIG. 1C

| TYPE 151 | RECEIVED POLICY THAT INDICATES | CREATE SGS AND SEND TO HTTP CLIENT | | | | GENERATE EXPECTED DIGITAL SIGNATURE (SGS') | | | |
|---|---|---|---|---|---|---|---|---|---|
| | | RESPONSIVE TO | GENERATE DIGITAL SIGNATURE FROM | | | RESPONSIVE TO SUBSEQUENT | GENERATE DIGITAL SIGNATURE FROM | | |
| | | | SESSION NONCE | SGI(S) | | | SESSION NONCE | SGI'(S) | |
| | | | | INFO IN POLICY | INFO IN HTTP MESSAGE | | | INFO IN POLICY | INFO IN HTTP MESSAGE |
| PARAMETER TAMPERING (ENFORCING READ ONLY PARAMETER) 151 | NAME OF PARAMETER [AND URL, WHERE URL CAN BE *] 191 | HTTP RESPONSE | DEPENDS ON IMPLEMEN. | NAME OF PARAMETER [AND URL, WHERE URL CAN BE *] 191 | NAME OF PARAMETER [AND URL, WHERE URL CAN BE *] 191 AND VALUE OF PARAMETER 591 | HTTP REQUEST | DEPENDS ON IMPLEMEN. | NAME OF PARAMETER [AND URL, WHERE URL CAN BE *] 191 | NAME OF PARAMETER [AND URL, WHERE URL CAN BE *] 191 AND ITS PURPORTED VALUE 592 |
| FORCEFUL BROWSING (ENFORCING APPLICATION FLOW) 152 | PREREQUISITE URL 192 AND URL REQUIRING PREREQUISITE 193 | HTTP REQUEST | DEPENDS ON IMPLEMEN. | PREREQUISITE URL 192 | PREREQUISITE URL 192 | HTTP REQUEST | DEPENDS ON IMPLEMEN. | PREREQUISITE URL 192 (NOT IN SUBSEQUENT HTTP REQUEST) | |
| COOKIE POISONING (DETECTING COOKIE POISONING) 153 | WEB APPLICATION COOKIE NAME 194 | HTTP RESPONSE | DEPENDS ON IMPLEMEN. | WEB APPLICATION COOKIE NAME 194 | WEB APPLICATION COOKIE NAME 194 AND ITS VALUE 594 | HTTP REQUEST | DEPENDS ON IMPLEMEN. | WEB APPLICATION COOKIE NAME 194 | WEB APPLICATION COOKIE NAME 194 AND ITS PURPORTED VALUE 595 |

FIG. 1D

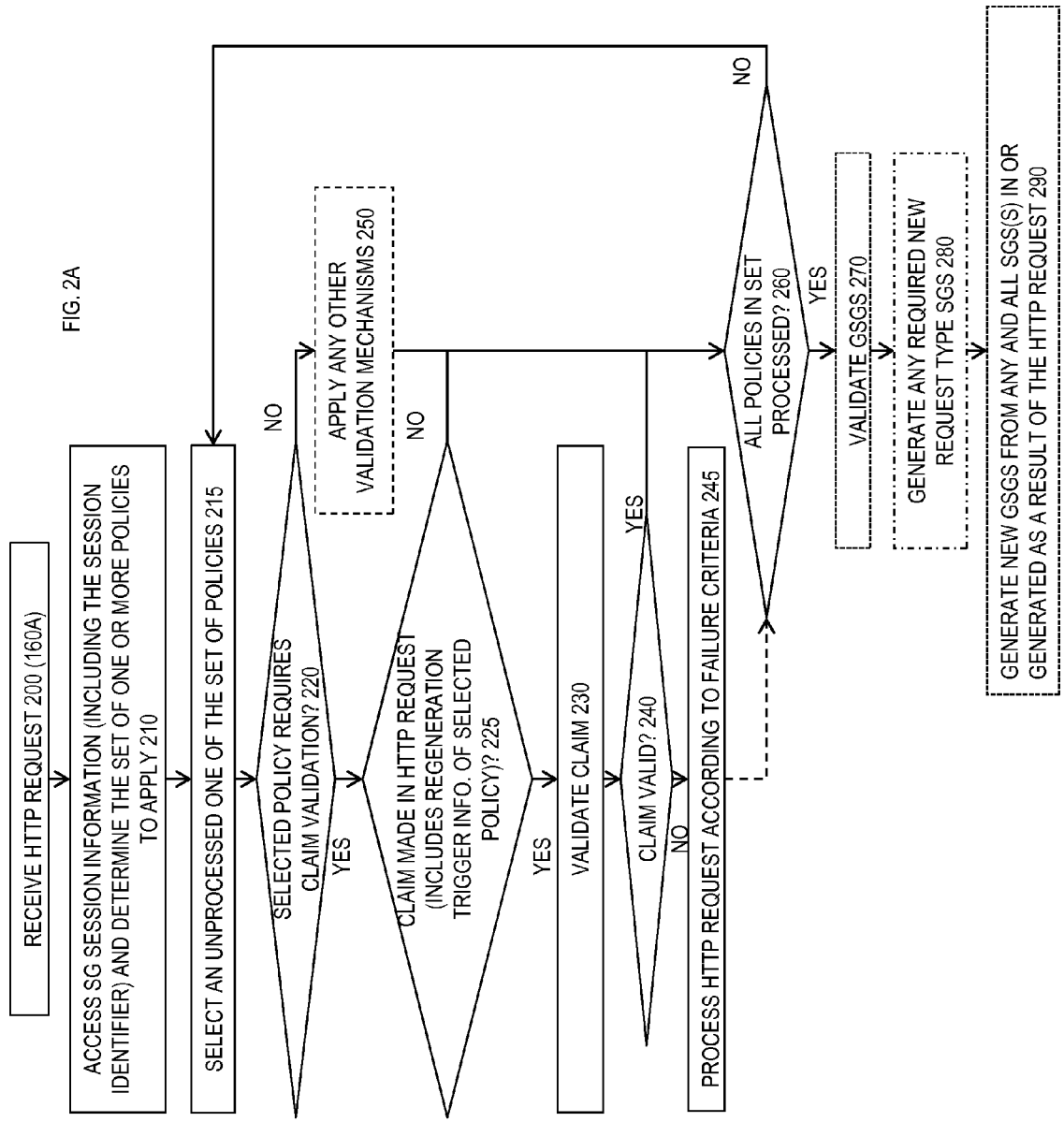

| TYPE 151 | SGC IDENTIFIER (OPTIONAL – ALLOWS TO FIND SGC(S) IN HTTP MESSAGES FASTER) | ACTION (OPTIONAL – REDUCE THE NUMBER OF COOKIES NEED TO EVALUATE AGAINST A GIVEN POLICY RULE) | CREATION TRIGGER INFORMATION FROM POLICY (OPTIONAL) |
|---|---|---|---|
| PARAMETER TAMPERING (ENFORCING READ ONLY PARAMETER) 151 | SG_STATE_SIGNATURE_ | READONLY_ | <NAME OF PARAMETER>[_<DIGEST OF URL WHICH CAN BE *>] (TO REDUCE THE NUMBER OF COOKIES NEED TO EVALUATE AGAINST A GIVEN POLICY RULE) |
| FORCEFUL BROWSING (ENFORCING APPLICATION FLOW) 152 | SG_STATE_SIGNATURE_ | FLOW_ | <DIGEST OF PREREQUISITE URL THAT WAS ACCESSED> (TO REDUCE THE NUMBER OF COOKIES NEED TO EVALUATE AGAINST A GIVEN POLICY RULE) |
| COOKIE POISONING (DETECTING COOKIE POISONING) 153 | SG_STATE_SIGNATURE_ | POISON_ | <WEB APPLICATION COOKIE NAME> |

FIG. 3

DEALING WITH WEB ATTACKS USING CRYPTOGRAPHICALLY SIGNED HTTP COOKIES

FIELD

Embodiments of the invention relate to the field of networks; and more specifically, to network security.

Background

A web application is a computer software application that is hosted in a web browser-controlled environment or coded in a web browser-supported language (such as JavaScript, combined with a browser-rendered markup language like Hyper Text Markup Language (HTML)) and reliant on a common web browser to render the application executable.

The Hypertext Transfer Protocol (HTTP) is a networking protocol that functions as a request-response protocol in the client-server computing model. In HTTP, a web browser, for example, acts as a client (referred to as an HTTP client), while a web application running on a computer hosting a web site functions as a server (referred to as a web application server). The HTTP client submits an HTTP request message to the web application server. The web application server, which stores content, or provides resources, such as HTML files, or performs other functions on behalf of the HTTP client, returns a response message to the HTTP client. A response contains completion status information about the request and may contain any content requested by the HTTP client in its message body. HTTP Resources are identified and located on the network by Uniform Resource Identifiers (URIs)—or, more specifically, Uniform Resource Locators (URLs)—using the HTTP or HTTPS URI schemes. The original version of HTTP (HTTP/1.0) was revised in HTTP/1.1 (RFC 2616).

A session is a semi-permanent interactive information interchange between two or more communicating devices. A session is set up or established at a certain point in time, and torn down at a later point in time. An established communication session may involve more than one message in each direction. A session is typically, but not always, stateful, meaning that at least one of the communicating parts needs to save information about the session history in order to be able to communicate, as opposed to stateless communication, where the communication consists of independent requests with responses.

HTTP is stateless: an HTTP client must establish a new network connection (e.g., using Transmission Control Protocol (TCP)) to the web application server with each new HTTP GET or POST request. The web application server, therefore, cannot rely on an established TCP network connection for longer than a single HTTP GET or POST operation. Session management is the technique used to make the stateless HTTP protocol support session state. For example, once authentication has occurred between an HTTP client and the web application server (e.g., through a user name and a password), the next HTTP request (GET or POST) from the HTTP client should not cause the web application server to request authentication again. Cookies (described below) are typically used for session management. The session between an HTTP client and a web application server is referred to as a web application session, and the current session information is referred to as the web application session state information.

The session information (or web application session state information) may or may not be stored on the web application server indexed by a session identifier (session ID) generated as a result of the first (sometimes the first authenticated) request from the HTTP client. The "storage" of session IDs and the associated session data (user name, account number, etc.) on the web application server may be accomplished using a variety of techniques including, but not limited to: local memory, flat files, and databases. In situations where multiple web application servers must share knowledge of session state (as is typical in a cluster environment) session information must be shared between the cluster nodes that are running web application server software.

A cookie, also known as a web cookie, browser cookie, and HTTP cookie, is a piece of text stored by the HTTP client (in what is sometimes called the cookie store). A cookie can be used for authentication, storing web site preferences, shopping cart contents, the identifier for a server-based session, etc. A cookie is a name-value pair with some additional attributes as defined in RFC 2109. The cookie is sent as a field in the header of an HTTP response by a web application server to a web browser and then sent back unchanged by that web browser each time it accesses that web application server.

By way of an operational example, an HTTP client requests a web page from a web application server by sending an HTTP request. For example, to access the page http://www.example.org/index.html, browsers connect to the server www.example.org sending it an HTTP request that looks like the following:

GET /index.html HTTP/1.1
Host: www.example.org

The server replies by sending the requested page preceded by a similar packet of text, called HTTP response. This packet may contain lines requesting the browser to store cookies:

HTTP/1.1 200 OK
Content-type: text/html
Set-Cookie: name=value
Set-Cookie: name2=value2; Expires=Wed, 9 Jun. 2021 10:18:14 GMT
(content of page)

The web application server sends lines of Set-Cookie only if the web application server wishes the browser to store cookies. Set-Cookie is a directive for the browser to store the cookie and send it back in future requests to the web application server (subject to expiration time or other cookie attributes), if the browser supports cookies and cookies are enabled. For example, the browser requests the page http://www.example.org/spec.html by sending the web application server www.example.org an HTTP request like the following:

GET /spec.html HTTP/1.1
Host: www.example.org
Cookie: name=value; name2=value2
Accept: */*

This is a request for another web page from the same web application server, and differs from the first one above because it contains the string that the web application server has previously sent to the browser. This way, the web application server knows that this request is related to the previous one. The web application server answers by sending the requested page, possibly adding other HTTP cookies as well.

The value of an HTTP cookie can be modified by the web application server by sending a new Set-Cookie: name=newvalue line in response of a web page request. The browser then replaces the old value with the new one.

Cookies can also be set by JavaScript or similar scripts running within the browser. In JavaScript, the object document.cookie is used for this purpose. For example, the instruction document.cookie="temperature=20" creates a cookie of name temperature and value 20.

A HTTP message may include a header, a message body, and a trailer. A core set of fields is standardized by the Internet Engineering Task Force (IETF) in RFC 2616, and other updates and extension documents (e.g., RFC 4229). Additional field names and permissible values may be defined by each application.

Two alternative name value pairs for HTTP responses are the content-length field with a length value and the Transfer-Encoding field with a value of chunked. The value for the content-length field identifies the length of the response body and is used when the response body is sent all at once. The chunked transfer encoding is a data transfer mechanism in version 1.1 of the HTTP in which a web application server serves content in a series of chunks as opposed to all at once. Because the Content-Length header is not used, the web application server does not need to know the length of the content before it starts transmitting a response to the HTTP client. As such, using the chunked transfer encoding, web application servers can begin transmitting responses with dynamically-generated content before knowing the total size of that content. The size of each chunk is sent right before the chunk itself so that a client can tell when it has finished receiving data for that chunk. The data transfer is terminated by a final chunk of length zero.

HTTP parameters are typically short pieces of data that are sent from the HTTP client to the web application server. HTTP parameters may be sent a variety of ways, including through the HTTP GET method (by tacking them on the end of an HTTP request—hence they are called HTTP request parameters) or using the HTTP POST method. In principle, the HTTP GET method requests the contents of a particular URL; while the HTTP POST method "sends" data to a particular URL. By way of example, assume the below HTML form is provided to the HTTP client.

<form action="http://www.examplesite.com/login">
<input type=text name="username">
<input type=submit>

Responsive to this HTML form, the username mcjones is entered; and submittal of this form causes the HTTP request parameter ?username=mcjones to be tacked on the URL to form http://www.examplesite.com/login?username=mcjones.

In addition to using HTTP request parameters in forms, they may also be used: 1) to send data via some applications interfaces to a call a web server; and 2) to send data to AJAX (Asynchronous JavaScript and XML) web applications. While formerly any user action required a web page to be reloaded from the web application server, AJAX allows an HTTP client to retrieve data from the web application server asynchronously in the background without interfering with the display and behavior of the existing page.

BRIEF DESCRIPTION OF THE DRAWINGS

The invention may best be understood by referring to the following description and accompanying drawings that are used to illustrate embodiments of the invention. In the drawings:

FIG. 1C is a table illustrating various types of exemplary policies that may be present in policies 150 according to certain embodiments of the invention;

FIG. 1D is a table illustrating the SGS(s) and corresponding expected digital signature (SGS'(s)) according to certain embodiments of the invention;

FIG. 2A is a flow diagram illustrating the processing of a received HTTP request (e.g., one of HTTP request messages 160A) by the security gateway according to certain embodiments of the invention;

FIG. 3 is a table illustrating the naming convention used according to certain embodiments of the invention;

DESCRIPTION OF EMBODIMENTS

Figure 1A:
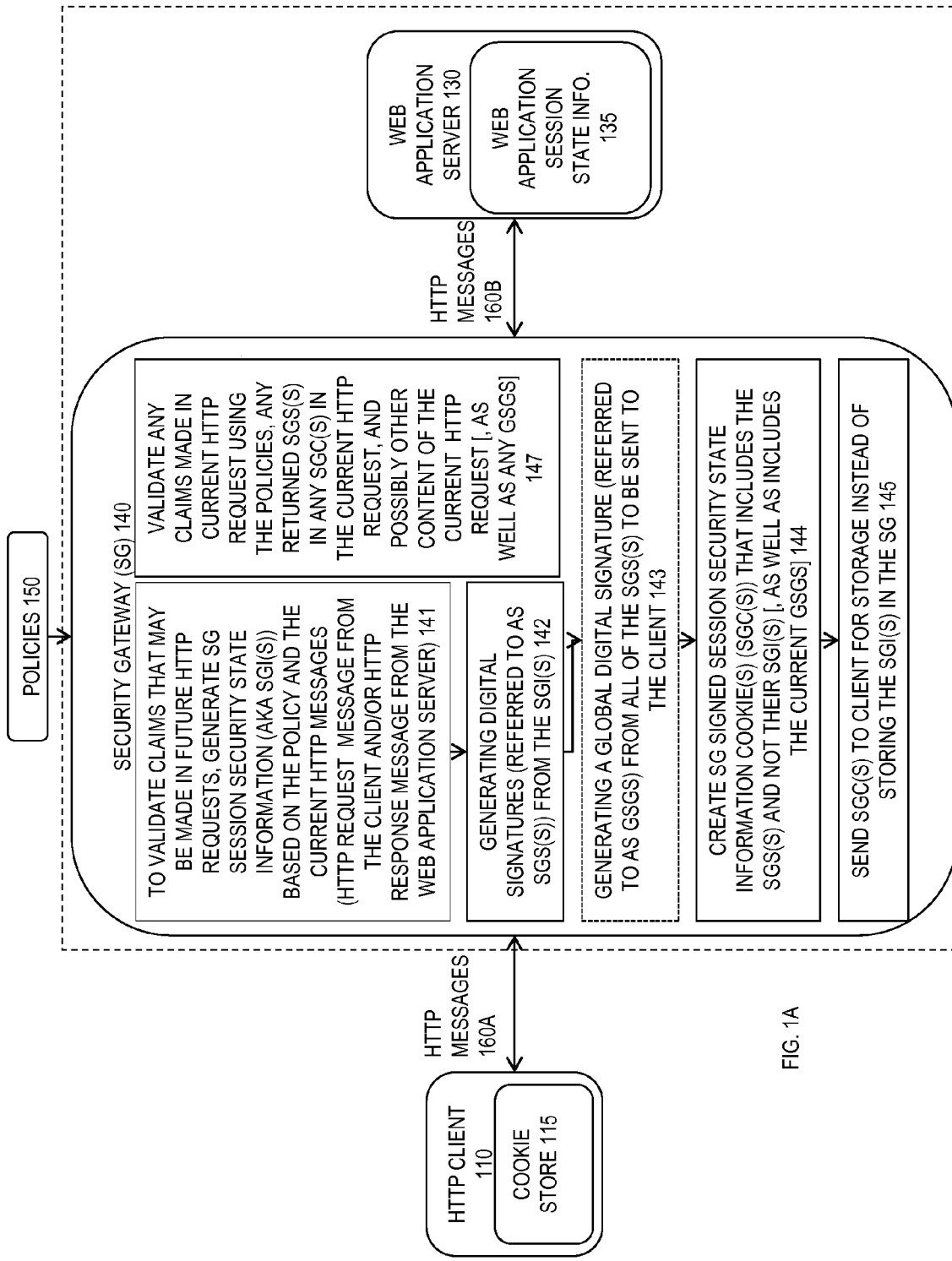
FIG. 1A is both a block and a flow diagram illustrating a technique for dealing with web attacks using cryptographically signed HTTP cookies according to certain embodiments of the invention

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) running an HTTP client (e.g., a web browser) access content/services provided over the Internet and/or content/services provided on virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, client end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Bracketed text and blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention.

Exemplary Attack Types

By way of example, and not by limitation, a few types of web attacks and ways of dealing with those web attacks are described.

A first type of attack is parameter tampering. Parameter tampering is an attack in which the attacker introduces values into parameters of an HTTP request that were not expected by the application. By way of specific example, there are parameters of an HTTP request referred to as read only parameters because their values are not expected to be directly manipulated by the user of the HTTP client (e.g., mechanisms that define the allowed values for read only parameters include links in HTML pages, hidden parameters in HTML forms, values of a selection box, and values of radio buttons). As such, embodiments of the invention include a way of detecting parameter tampering of read only parameters and enforcing read only parameter to prevent such parameter tampering.

A second type of attack is forceful browsing. This kind of attack occurs when the attacker "forces" a URL by accessing it directly instead of following links (or other application flow controls). As one example, attackers use forceful browsing to retrieve pages or perform operations that would otherwise require authentication. As another example, sometimes web pages are designed that after getting web page A, an HTTP client may access web page B only one time. Attackers use forceful browsing to retrieve web page B multiple times. As such, embodiments of the invention include a way of detecting a forceful browsing attack and enforcing application flow to prevent that attack.

A third type of attack is cookie poisoning. This kind of attack is when the attacker is replacing the value of an HTTP cookie set by the web application server with a value chosen by the attacker, before delivering the HTTP request from the HTTP client to the web application server. As such, embodiments of the invention include a way of detecting cookie poisoning.

Exemplary Overview

FIG. 1A is both a block and a flow diagram illustrating a technique for dealing with web attacks using cryptographically signed HTTP cookies according to certain embodiments of the invention. In FIG. 1, an HTTP client 110 (e.g., a web browser executing on a client end station) is having a web application session with a web application server 130 (e.g., executing on a server end station) that involves exchanging HTTP messages 160.

Implementing the session management technique, the web application server 130 stores the current state information pertaining to that web application session—illustrated as web application session state information 135. This web application session state information 135 includes the session identifier (session id) that identifies the web application session between the HTTP client 110 and the web application server 130. In addition, the web application session state information 135 includes associated session data (username, account number, etc.).

The HTTP client 110 includes a cookie store 115 to store HTTP cookies sent to the HTTP client 110 by the web application server 130.

A security gateway (SG) 140 is coupled to receive the HTTP messages 160 being transmitted between the HTTP client 110 and the web application server 130 as part of the web application session. In FIG. 1A, the HTTP messages 160 are labeled HTTP messages 160A when traveling between the HTTP client 110 and the security gateway 140, and labeled HTTP messages 160B when traveling between the security gateway 140 and the web application server 130. Thus, a given HTTP request message transmitted by the HTTP client 110 for delivery to the web application server 130 is represented by the HTTP messages 160A as it travels to the security gateway 140, and then represented by the HTTP messages 160B as it travels from the security gateway 140 to the web application server 130. The reverse is true for a given HTTP response message sent by the web application server 130 to be delivered to the HTTP client 110.

FIG. 1A also illustrates that the security gateway 140 is also coupled to receive policies 150 that are used by in performing security operations, which include detecting web attacks in the web application session between the HTTP client 110 and the web application server 130. In one embodiment of the invention, these security operations also include network firewall and/or intrusion prevention.

Embodiments of the invention are described herein with reference to a security gateway 140 that is not privy to the code of the web application server 130 and the web application session state information 135. In fact, the only knowledge and/or access that the security gateway 140 may have with regard to the web application session state information 135 is the content of the HTTP messages 160 the security gateway 140 receives. Based on these HTTP messages 160 and the policies 150, the security gateway 140 causes the generation of state information pertaining to the web application session between the HTTP client 110 and the web application server 130 (referred to herein as security gateway session security state information (SGI)). The security gateway 140 generates the SGI(s) and causes them to be stored in order to ensure consistency of subsequent ones of the HTTP requests from the HTTP client 110 with the current web application session state information 135.

The security gateway 140 digitally signs the SGI(s) to generate digital signatures referred to herein as SGS(s), and transmits the SGS(s) to the HTTP client 110 for storage using HTTP cookie(s) (which cookies are referred to herein as SGC(s)). More specifically, the SGC(s) are to be stored in the cookie store 115 along with any other cookies that were generated and sent by the web application server 130 to the HTTP client 110. Since according to HTTP the HTTP client is to return HTTP cookies with its HTTP requests, the HTTP client will return the SGC(s) along with any other HTTP cookie with its HTTP requests. As described herein, since the security gateway 140 has access to the content of the HTTP requests (including any returned SGCs) and the policies 150, the security gateway 140 need not store the SGI(s) or SGS(s) to detect web attacks.

Within security gateway 140, two flows are illustrated. The first flow begins at block 141. In block 141, in order to validate claims that may be made (by information) in future HTTP requests, the security gateway generates SGI(s) based on the policy and the current HTTP message(s) (HTTP request message from the HTTP client and/or the HTTP response message from the web application server). Control flows from block 141 to block 142

In block 142, digital signatures (referred to herein as SGS(s)) are generated from the SGI(s). As described below, this may include the use of a session nonce. Both a session identifier and a session nonce identify a web application; but a session identifier is used by the client and server and shared by cookies, while the session nonce is used to distinguish session information so that information from one session cannot be used in another. In fact, while their purpose is different, the same value (the session identifier value) is used for both the session identifier and session nonce in some embodiments of the invention. However, since the session identifier flows between HTTP client and web application server, an attacker can in theory "forge" a digital signature by setting an arbitrary session identifier. As such, in other embodiments the session nonce may take other forms, such as a random nonce per each session identifier that is stored in the security gateway, a value derived by applying a keyed HMAC function to the session identifier, etc. Different embodiments of the invention may generate digital signatures in different ways (e.g., applying a signing algorithm to an SGI(s); applying a signing algorithm to a combination of an SGI(s) and one or more other values (e.g., a session nonce); applying the signing algorithm to a hash of an SGI(s) (also known as a digest); applying the signing algorithm to a hash of a combination of an SGI(s) and one or more other values (e.g., a session nonce) (also known as a digest); applying the signing algorithm to a combination of one or more other values (e.g., a session nonce) and a hash of an SGI(s) (also known as a digest)). From block 142, control passes to dashed block 143.

Dashed block 143 represents one of the operations performed by the embodiments of the invention that implement what is referred to herein as global digital signatures. Specifically, block 143 shows the generation of a single global digital signature (referred to as GSGS) from all of the SGS(s) to be sent to the client. Thus, the single GSGS attests to the validity of all of the current SGS(s). The use of GSGS(s) allows the security gateway 140 to invalidate SGS(s), which may be used to restrict a given HTTP client to holding a single SGS for a given part of the state, restricting the usage of a given SGS to once per web application session, and/or to invalidate a previously delivered SGS before it is even put to use. The varieties of ways to generate a digital signature described above with reference to SGI(s) are equally applicable to generating a GSGS, but the SGI(s) in the above description are replaced with SGS(s). Control passes from block 143 to block 144 (in embodiments in which block 143 is not implemented, control passes from block 142 directly to block 144).

In block 144, security gateway signed session security state information cookie(s) (referred to herein as SGC(s)) are created that include the SGS(s) (and not the SGI(s) from which they were created) [and the current GSGS]. Specifically, the SGS(s), and optionally the current GSGS, are stored as the value(s) of HTTP cookie(s) created by the security gateway 140. Thus, this type of cookie is referred to as a cryptographically signed HTTP cookie or SGC for short. From block 144, control passes to block 145.

As shown in block 145, the SGC(s) are sent to the HTTP client for storage instead of storing the SGI(s) or SGS(s) in the security gateway. As described above, these SGC(s) would be stored in the cookie store 115 of the HTTP client 110. As a result of this storage by the HTTP client 110, the security gateway 140 is free discard the SGI(s), SGS(s), and GSGS. This marks the end of the first flow.

The second flow illustrated within the security gateway 140 consists of a single block 147. Block 147 pertains to the operation of validating claims based upon the SGC(s) created responsive to a prior HTTP transaction. In block 147, any claims made (by information) in the current HTTP request are validated using the policies, any returned SGS(s) in any returned SGC(s) in the current HTTP request, and possibly other content of the current HTTP request [, as well any GSGS that was returned as part of the HTTP request]. In one embodiment of the invention, the validation is performed by generating an expected digital signature (SGS'), in the same manner used to generate the SGS(s), from at least part of the HTTP request and/or part of the information included in the policy; whether this SGS' matches one of the SGS(s) returned is indicative of whether a web attack has occurred. In other words, for a given SGS (AKA first digital signature), the generating of the SGS' (AKA second digital signature), in the same manner used to generate the first digital signature, from at least part of the HTTP request and/or part of the information included in the policy yields matching digital signatures or different digital signatures respectively depending on whether the web attack has occurred. It should be understood that a single HTTP request may result in one of, both of, or none of: 1) the generation of an SGI/SGS; and 2) the validation of a claim using a previously generated SGS in an SGC.

To further explain the above, FIG. 1C is a table illustrating various types of exemplary policies that may be present in policies 150 according to certain embodiments of the invention. Specifically, the header row respectively forms the following three columns: 1) type 151; 2) information (referred to as creation trigger information 155) that when present in HTTP requests/responses cause the creation of SGI(s); and 3) information (referred to as regeneration trigger information 156) that when present in HTTP requests cause regeneration of the SGSs. Each of the other rows of the table describes one of each of the above described types of attacks.

Specifically, the first row (not counting the header row) has the following for each of the three columns: 1) parameter tampering (enforcing read only parameters) 152; 2) name of parameter [and optionally, a URL where that URL can be *] 191 in the HTTP response (where * represents a wildcard); and 3) same as the second column. Using this particular exemplary type of attack to illustrate an example of block 141, an HTTP response message 160B sent by the web application server 130 to be delivered to the HTTP client 110 includes an HTTP parameter with the same name as that found in the policies 150 (and if a URL is present in the policies, the URL in the policies matches that in the HTTP response), and thus creation trigger information is present and the security gateway generates an SGI. As described later herein, this SGI includes the name of the parameter and its read only value. In blocks 142-145, a SGS would be generated from the SGI and delivered to the HTTP client 110 in an SGC. The HTTP client 110 would store the SGC in its cookie store 115, and then return that SGC when the next HTTP request message that the HTTP client 110 sends as part of the same web application session. In addition to the SGC, assume that the HTTP request also includes the name of the parameter and a value for that parameter. In block 147, this name of the parameter would represent regeneration trigger information as illustrated in the last column, first row of FIG. 1D. In other words, this parameter name and value in the HTTP request is making a claim and the security gateway will be triggered pursuant to the policy to validate that claim. To validate, the security gateway 140 generates an expected digital signature (SGS') in the same manner as the digital signature in block 142, but this time the SGS will include the parameter name and the value from the HTTP request. This expected digital signature is then compared to the SGS from the SGC. If they match, then the parameter's value in the HTTP request matches its read only value from the prior HTTP response—and thus, has not been tampered with. However, if they do not match, then the parameter's read only value has been tampered with.

Figure 1B:
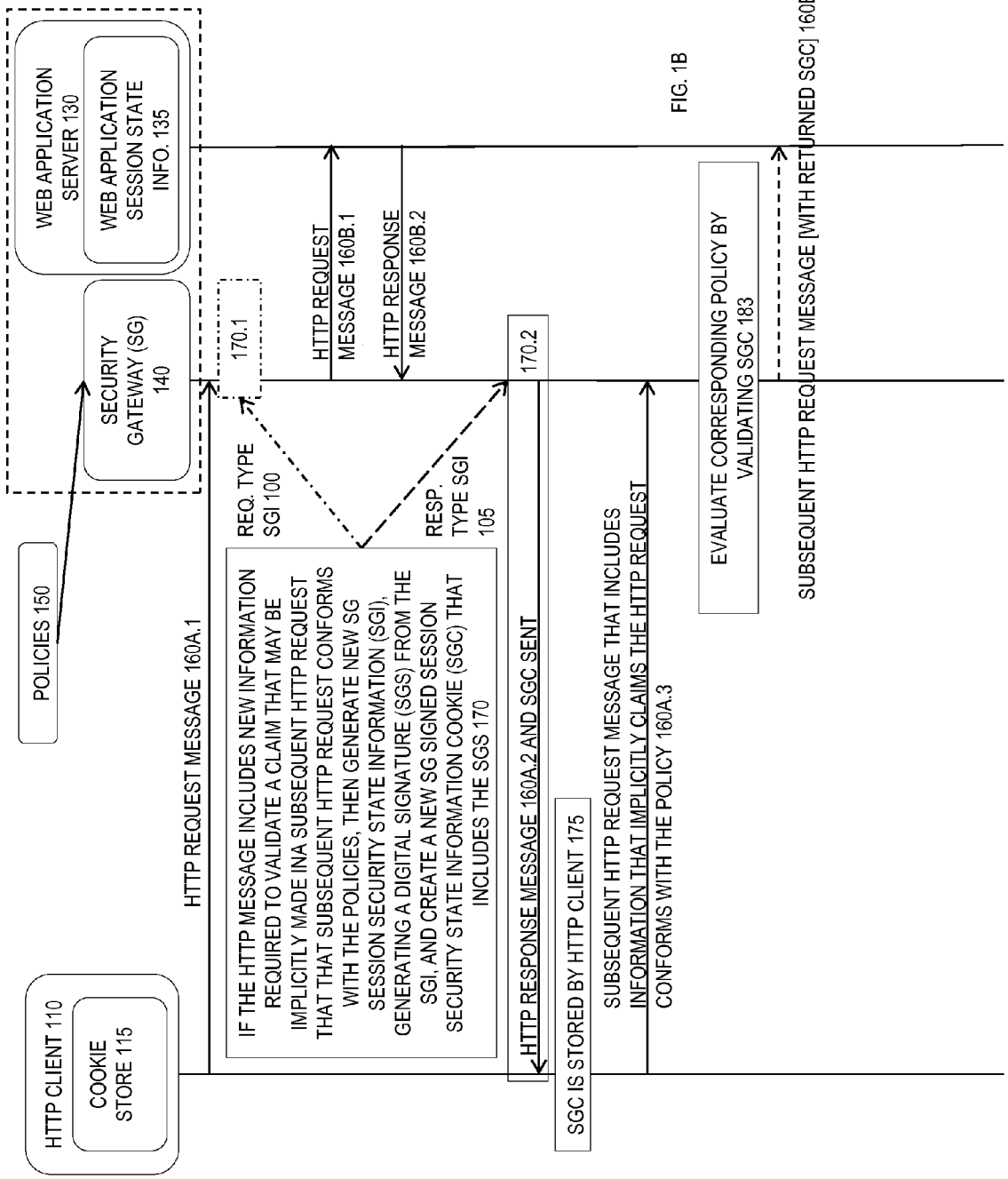
FIG. 1B is a transaction diagram illustrating more detail with regard to the generation of a single SGI and an evaluation of a claim related to that single SGI according to certain embodiments of the invention.

FIG. 1B is a transaction diagram illustrating more detail with regard to the generation of a single SGI and an evaluation of a claim related to that single SGI according to certain embodiments of the invention. FIG. 1B uses the same reference numerals as FIG. 1A (HTTP client 110, cookie store 115, security gateway 140, web application server 130, web application session state information 135, and policies 150), as well as reference numerals that specify individual ones of the HTTP messages 160A-B by adding a period followed by a number. Specifically, FIG. 1B starts off with the HTTP client 110 transmitting an HTTP request message 160A.1, which is received by the security gateway 140. In FIG. 1B, this HTTP request message is forwarded as HTTP request message 160B.1 to the web application server 130. The web application server 130 reacts by transmitting an HTTP response message 160B.2, which is received by the security gateway 140.

FIG. 1B also includes a block 170 which may be invoked at different times depending upon the features implemented in different embodiments of the invention. Specifically, an SGI may be created responsive to an HTTP request (block 170.1) (referred to as a request type SGI 100), and responsive to an HTTP response message (block 170.2) (referred to as a response type SGI 105). Since different embodiments of the invention may support only one of or both of request and response type SGIs, block 170.1 is a dashed block and block 170 is not; further, even though embodiments may not support response type SGIs 105, block 170.2 is not dashed because it also represents the sending of the HTTP responses and SGCs to the HTTP client 110.

In block 170, if the HTTP message (be it an HTTP request message and/or an HTTP response message depending on whether a given embodiment supports both request type SGI(s) and response type SGI(s)) includes new information required to validate a claim that may be implicitly made (by information) in a subsequent HTTP request that that HTTP request conforms with the policies, then the security gateway 140 generates a new SGI, generates an SGS from the SGI, and creates a new security gateway signed session security state information cookie (SGC) that includes the SGS.

In block 170.2, the HTTP response message 160A.2 and SGC are sent by the security gateway 140 to the HTTP client 110. It should be understood that the HTTP response message 160B.2 has been modified to create the HTTP response message 160A.2 (in other words, the HTTP response message 160A.2 is a modified version of the HTTP response message 106B.2). This modification is made to accommodate the sending of the SGC generated by the security gateway 140 for storage on the HTTP client 110 in its cookie store 115. It is worth noting that the block 170.2 extends between the security gateway 140 and the HTTP client 110 to illustrate that there are a variety of ways described later herein to communicate the SGC from the security gateway 140 to the HTTP client. While in some of these techniques the SGC is included in the HTTP response message 160A.2, alternative techniques require that the SGC be accessed through a separate request by the HTTP client 110 responsive to receipt of the HTTP message 160A.2. Thus, the modification to the HTTP response message 160A.2 results in an HTTP cookie (SGC) that includes a first digital signature (SGS) being sent by the SG to the HTTP client 110.

Block 175 illustrates that the SGC is stored by the HTTP client 110. This is followed by a subsequent HTTP request message 160A.3 transmitted by the HTTP client 110 for delivery to the web application server 130. This subsequent HTTP request message includes information that implicitly claims that the HTTP request conforms with the policy.

Responsive to the receipt of this HTTP request message 160A.3, the security gateway 140 performs block 183. In block 183, the security gateway evaluates the corresponding policy by validating the SGC. If all is working properly, the HTTP request message 160A.3 should include the SGC, which in turn includes the SGS. The information that implicitly claims the HTTP request conforms with the policy is the previously described regeneration trigger information 156, which causes the regeneration of the SGI', and then SGS' there from. This SGS' is compared to the SGS contained within the returned SGC.

Depending on the outcome of this evaluation, the HTTP request message 160A.3 may be transmitted by the security gateway to the web application server 130 as HTTP request message 160B.3. Depending on the embodiment of the invention, the HTTP request message 160B.3 may include the returned SGC, or the security gateway 140 may modify the HTTP request message 160A.3 to remove the returned SGC before sending on the HTTP request message 160B.3.

Thus, the security gateway 140 derives the SGI(s) from the contents of the HTTP messages 160 and/or the policies 150, where the content of the HTTP messages effectively make a claim regarding the current web application sessions state information 135 which may or may not have been stored by the web application server 130.

In the illustrated embodiment, in the case of a request type SGI 100 (block 170.1), the SGS and SGC that will carry that SGS are not sent to the HTTP client 110 until block 170.2. In this case, the request type SGI 100 is referred to as a pending SGI and must be stored by the security gateway 140 until it can be transmitted to the HTTP client 110. While in some embodiments of the invention, the request type SGI 100 is stored until it may be transmitted, alternative embodiments of the invention generate the corresponding SGS, discard the request type SGI 100, and store the request type SGS as a pending SGS until it can be transmitted to the HTTP client. The term pending SGI/SGS(s) refers to the use of either of these two approaches.

Similarly, embodiments of the invention are described with reference to block 170.2 in which the SGC is not sent with the HTTP response message 160A.2, but rather the content of the HTTP response message 160A.2 causes a subsequent request by the HTTP client 110 for the SGC. In certain embodiments that utilize this approach, there may be pending request type SGI(s) 100 (or corresponding pending SGS(s)), pending response type SGI(s) 105 (or corresponding pending SGS(s)), and/or a pending GSGS that must be stored by the security gateway until they may be sent to the HTTP client 110. However, the storage of any pending SGI(s), SGS(s), and/or GSGS(s) is relatively short as compared to a security gateway that did not use cryptographically signed HTTP cookies to distributively store SGS(s).

Of course, the security gateway 140 may delete any pending SGI(s), SGS(s) and GSGS once they have been transmitted for distributive storage by the HTTP clients. The security gateway 140 would store during the entire web application session some identifier of the web application session (e.g., the session identifier for the web application session, and possibly the session nonce depending on how it is implemented as described above) in order to track the web application session.

Returning to FIG. 1C, rows two and three will now be described. In row two, the cell contents for the three columns are respectively: 1) forceful browsing (enforcing application flow 153) which refers back to the second type of attack described above); 2) a prerequisite URL 192 in the HTTP request (in the case where the HTTP client must visit webpage A prior to webpage B, this prerequisite URL is the URL for webpage A; the existence of the URL for webpage A in the HTTP request is the creation trigger information); and 3) the URL requiring the prerequisite 193 (in the preceding example, this would be the URL for webpage B, and its existence in the HTTP request would be regeneration trigger information).

It is worth noting that the creation trigger information for forceful browsing 153 is found in the HTTP request, and therefore is an example of a request type SGI 100 which is created in block 170.1. In contrast, the creation trigger information 155 for the parameter tampering 152 type attacks is found in the HTTP response, and thus is an example of a response type SGI that would be created in block 170.2.

In row three, the cell contents for the three columns are respectively: 1) cookie poisoning (detecting cookie poisoning) 154 (this refers to the third of the above exemplary attacks); 2) set cookie command with a web application cookie name 194 in the HTTP response; and 3) the web application cookie name 194. Thus, the existence of a set cookie command with the identified web application cookie name in the HTTP response 160B.2 would cause the generation of a response type SGI 105. A subsequent HTTP request with that web application cookie name would cause an evaluation of the policy by validating the corresponding SGC created responsive to the creation trigger information.

The policy information can be populated in one of many ways or in a combination of methods. In one embodiment policies are created manually by a person knowledgeable of the application logic. For example, a security administrator can fill in a policy generation form that contains text fields for URL A and URL B in order to define an application flow policy, or a different form that contains text fields for URL and parameter name in order to create a read-only parameter policy. In another embodiment policies can be generated based on a machine learning mechanism that analyses standard client-server interaction over time (i.e. Dynamic Profiling). Yet in a different embodiment, policies could be generated based on automatic processing of reports provided by web vulnerability scanner programs.

FIG. 1D is a table illustrating the SGS(s) and corresponding expected digital signature (SGS'(s)) according to certain embodiments of the invention. Specifically, the table uses the same exemplary three attacks previously described above. Thus, the left most column of this table is identical to the left most column of the table in FIG. 1C. While the table in FIG. 1D illustrates by way of example the three previously described exemplary types of attacks, it will be apparent to one of ordinary skill in the art that the techniques may be extended to include other types of attacks.

The second column of the table in FIG. 1D consolidates the second and third columns from the table in FIG. 1C. As such, the cell in the header row for this column is titled "received policy that indicates."

This second column is followed by the following two major columns whose header row cells are: 1) create SGS and send to HTTP client; and 2) generate the corresponding expected digital signature (SGS'). These major cells of the header row are broken down into three tiers of sub-cells representing sub-columns. The "create SGS column" will be described first. The first tier divides this column into: A) responsive to (which is used to distinguish whether the SGS is created responsive to an HTTP request (a request type SGI/SGS) or an HTTP response (a response type SGI/SGS)); and B) generate digital signature from (which represents the data from which the SGS is generated according to certain embodiments of the invention). The second tier divides the "generate digital signature from" column into: i) session nonce (depends on implementation—e.g., if the session nonce is the session ID or derived from the session ID, then the session ID can be accessed from the HTTP message being reacted to; if the session nonce is a random value generated for the session, then the value will have been stored by the security gateway and may be accessed using the session ID accessed from the HTTP message being reacted to); and ii) SGI(s) (where the optional plural form is used because multiple SGI(s) may be included in a single SGS in certain embodiments of the invention). Thus, the SGI(s) column illustrates the information that makes up an SGI for the different exemplary types of attacks. It should be understood that this is not necessarily the same information as the creation trigger information of the policy. For example, the creation trigger information for the parameter tampering 152 is the name of the parameter [and URL, where URL can be *] 191, while the SGI includes the name of the parameter, the value of the parameter found in the HTTP message, and [the URL, where the URL can be *].

The third tier breaks the SGI(s) column into two columns to illustrate where the information making up the SGI(s) can be found. Specifically, some information is found in both the policy and the HTTP message, while other information is found only in the HTTP message (where the information is found in the policy and the HTTP message, either source may be used for creating the SGI). Specifically, the SGI(s) column is broken into: a) information in the policy; and b) information in the HTTP message.

Turning now to the "generate the corresponding expected digital signature (SGS') column, a very similar three tier breakdown is used. The first tier breaks the "generate the expected digital signature (SGS')" column into: A) responsive to subsequent (which indicates the type of subsequent HTTP message for which a corresponding expected digital signature (SGS') would be generated); and B) generate digital signature from (which serves the same purpose as the previously introduced column by the same name, but in this case is for the expected digital signature SGS')). The second tier breaks the "generate digital signature from" column into: i) session nonce (which is the same as the column above with the same name); and ii) the corresponding expected SG session security state information (SGI'(s)). This latter column represents an attempt to collect the same information used to create the corresponding SGI(s) for the corresponding SGS, but that information is collected from a different source. As with the SGI(s), at least some of the information used to generate the SGI'(s) may be found in two different locations. And thus, the third tier breaks the "SGI'(s)" column into: a) info in policy; and ii) info in HTTP message (which is referring to the message found in the "responsive to subsequent" column)

Using the previously discussed example of parameter tampering 152 in which the SGS is formed from an SGI including the name of the parameter and value of the parameter [and URL, where the URL can be *] from the HTTP response (e.g., the HTTP response message 160B.2 from FIG. 1C), the corresponding SGI' is the same name of the parameter [and URL, where URL can be *], as well as the purported value for that parameter found in the subsequent HTTP request.

With regard to the forceful browsing 153 example, the policy identifies the prerequisite URL 192 (e.g., webpage A) and the URL requiring the prerequisite 193 (e.g., webpage B—that is, webpage A must be visited before webpage B). In this exemplary type of attack, the creation trigger information is the prerequisite URL 192 found in an HTTP request, the SGI includes the prerequisite URL 192, and the SGS is a digital signature generated from the session nonce and the prerequisite URL 192. If a subsequent HTTP request is received that includes the URL requiring prerequisite 193 (e.g., webpage B), this URL requiring prerequisite 193 acts as regeneration trigger information that causes the corresponding expected digital signature (SGS') to be generated. The SGS' is a digital signature generated from the session nonce and the prerequisite URL 192 (e.g., webpage A) which is accessed from the policy (note that the regeneration trigger information 156 in the policy for this example (the URL requiring prerequisite 193) need not be included in the SGI', but the prerequisite URL 192 located within the policy responsive to this regeneration trigger information is included—this is because the SGS' must be based on the same information used to generate the SGS to which it corresponds in order for there to be a match). Thus, if the SGS and SGS' match, the prerequisite URL 192 (e.g., webpage A) was visited prior to the URL requiring prerequisite 193 (e.g., webpage B). If they do not match, the prerequisite URL 192 has not been visited, signaling a forceful browsing attack. In the case of such an attack, the security gateway can take a variety of actions including redirecting the HTTP client to the prerequisite URL and others described herein.

With regard to the cookie poisoning 154 example, the policy identifies the web application cookie name 194. In response to an HTTP response that includes this web application cookie name 194 (the web application cookie name 194 is creation trigger information), an SGS is created from the session nonce and SGI; where the SGI includes the web application cookie name 194 and its value(s) from the HTTP response. If a later HTTP request includes the same web application cookie name 194 (which would be regeneration trigger information), then the corresponding expected digital signature (SGS') is generated from the session nonce, the web application cookie name 194, and that web application cookie's purported value(s) found in that HTTP request. If the SGS' matches the SGS returned in the SGC with the subsequent HTTP request, then it is determined that the HTTP cookie with the web application cookie name 194 has not been poisoned. However, if they do not match, it is determined that a cookie poisoning attack has been detected.

Returning to FIG. 1A, The dashed box surrounding the security gateway 140 and the web application server 130 signifies different possible levels of integration, including the following examples: 1) the security gateway 140 representing a separate application running on separate hardware from the web application server 130; 2) the security gateway 140 representing a separate application running in a separate virtual machine from the web application server 130, but both virtual machines are being executed on the same server hardware; and 3) the security gateway 140 representing a software module that is part of the web application server 130 (and thus is part of the same application running on the same hardware—and if virtual machines are used, running in the same virtual machine)).

Figure 6:
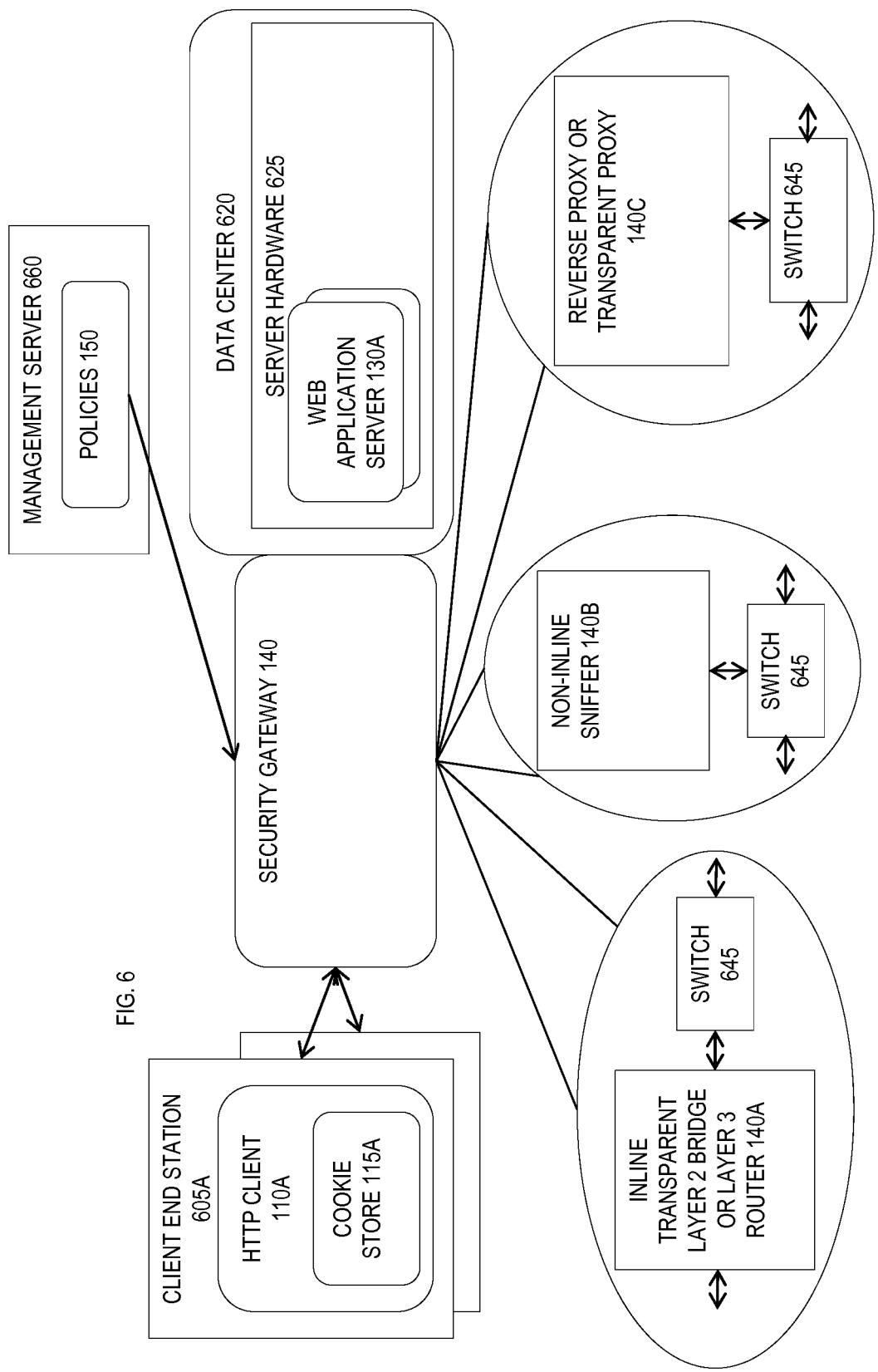
FIG. 6 illustrates exemplary deployment environments of the security gateway according to certain embodiments of the invention.

While FIG. 1A illustrates a single HTTP client 110 and a single web application server 130 for purposes of simplicity, the security gateway 140 is expected to be deployed in environments where there are multiple HTTP clients having simultaneous or concurrent sessions with the web application server 130, and possibly multiple web application servers each having simultaneous and/or concurrent sessions with multiple different and/or the same HTTP clients (for examples, see description later herein with reference to FIG. 6). Since the current session security state information for a single web application session may require the security gateway 140 to generate multiple SGI(s), the SGI storage requirements for the multiple web application sessions between the various HTTP clients and the web application server(s) can be relatively large for the SG.

The use of HTTP cookies allows SGSs to be delivered to HTTP clients for storage because the HTTP clients are designed to receive/store HTTP cookies and return them with subsequent HTTP requests; and the use of SGSs allows the SG to validate claims that may be made in HTTP requests subsequently transmitted by the HTTP clients to the set of web application servers as part of the web application sessions. As such, the use of SGCs allows for distributively storing in the HTTP clients digital signatures (SGSs) generated by the SG to validate claims that may be made in HTTP requests subsequently transmitted by the HTTP clients to the set of web application servers as part of the web application sessions. To put it another way, the use of SGCs allows the security gateway to distributively store security information in the HTTP clients that may be used to validate claims made is subsequently received HTTP request from those HTTP clients. Because the SGSs are distributively stored by the different HTTP clients (each HTTP client stores the SGS(s) for its web application session(s)), the security gateway 140 requires less storage and/or can handle a larger number of concurrent web application sessions than a security gateway that stores SGIs\SGSs.

Further, since the SGS(s), and the GSGS when implemented, are stored by the HTTP client and returned with the subsequent HTTP request, the validation represented by blocks 147 and 183 can be performed by a different security gateway than the one that generated them without any need to synchronize the security session state information between the two security gateways (assuming that both security gateways have read access to the policies 150). Thus, this allows for a distributive computing model to be used for the security gateway(s) without the overhead of synchronization of such information. Further, failover scenarios are simplified because the only synchronization required, if it is performed as opposed to just discarding, is any pending SGS(s) and GSGS(s).

Also, in embodiments where the digital signature (SGS) size remains constant regardless of the size of the SGI being signed, an SGC is also independent of the size of the SGI(s) and the technique: 1) is even more scalable; 2) requires the security gateway to make only minimal modifications to the HTTP response sent from the web application server to include the SGC before the security gateway sends that modified HTTP response to the HTTP client.

HTTP Request Processing

FIG. 2A is a flow diagram illustrating the processing of a received HTTP request (e.g., one of HTTP request messages 160A) by the security gateway according to certain embodiments of the invention. At a high level, this flow includes: 1) the evaluation of policies and validation of claims (e.g., block 147 from FIG. 1A and block 183 from FIG. 1B); 2) the use of global digital signatures GSGS(s) which may be optionally implemented in certain embodiments of the invention (e.g., see block 143 and bracketed text in blocks 144/147 from FIG. 1A); and 3) the use of request type SGI(s)/SGS(s) implemented in some embodiments of the invention (e.g., block 170.1 in FIG. 1B). Specifically, blocks 270 and 290 illustrate optional operations performed when processing an HTTP request in embodiments that support global digital signatures; while block 280 represents operations performed in embodiments that support request type SGI(s)/SGS(s).

In block 200, an HTTP request is received and control flows to block 210.

As shown in block 210, the SG session information (including the session identifier) is accessed from the HTTP request and used to determine the set of one or more policies to apply. From block 210, control flows to block 215.

In block 215, an unprocessed one of the set of policies is selected and control passes to block 220.

As shown in block 220, it is determined if the selected policy requires claim validation. If so, control passes to block 225; otherwise, control passes to block 250. Block 220 assumes that the policies 150 include not only policies used for cryptographically signed HTTP cookies, but also other types of security policies. As such, block 220 is directed at processing those policies related to cryptographically signed HTTP cookies by passing control to block 225; and processing other types of policies through control passing to block 250.

In block 225, it is determined if there is a claim made in the HTTP request (includes regeneration trigger information of the selected policy). If so, control passes to block 230; otherwise, control passes to block 260. In block 230, the claim is validated and control passes to block 240. A manner of performing block 230 is described later herein with reference to FIG. 2B. As shown in block 240, it is determined if the claim is valid. If not, control passes to block 245 (note that here, as in other flows, a lack of the SGS in the HTTP request results in flow passing to block 245); otherwise, control passes to block 260.

In block 245, the HTTP request is processed according to failure criteria. Different embodiments may implement block 245 in different ways, may include different possible actions (e.g., generate an alert and drop the HTTP request; generate an alert, drop the HTTP request, and respond with an error page; generate an alert and forward the HTTP request to the web application server), and may select between the available actions using different criteria. Depending upon the result of performing block 245, control may flow to block 260 as illustrated by the dashed arrowed line.

In block 260, it is determined if all policies in the set have been processed. If so, control passes to block 270; otherwise, control flows back to block 215.

In dashed block 270, GSGS validation is performed and control passes to block 280. A manner of performing block 270 is described later herein with reference to FIG. 2C.

As shown in dashed block 280, any required new request type SGI(s)/SGS(s) are generated and control passes to block 290. A manner of performing block 280 is described later herein with reference to FIG. 2D.

In block 290, a new GSGS is generated from any and all SGS(s) in the HTTP request or generated as a result of the HTTP request.

Dashed block 250 represents the application of non-cryptographically signed HTTP cookie policies. In block 250, any other validation mechanisms implemented in the embodiment are applied and control passes to block 260.

Figure 2C:
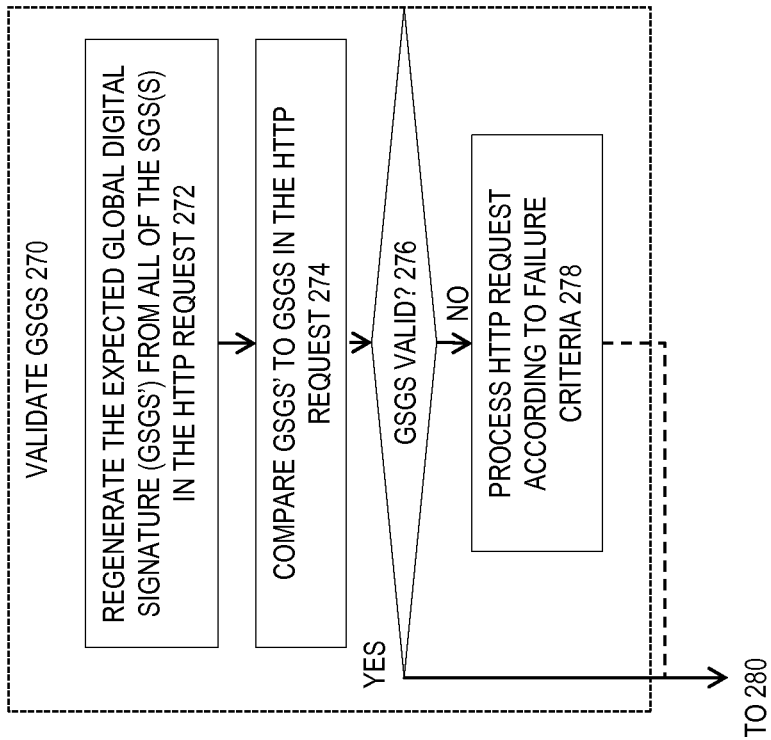
FIG. 2C is a block diagram illustrating a manner of performing block 270 from FIG. 2A according to certain embodiments of the invention.
Figure 2B:
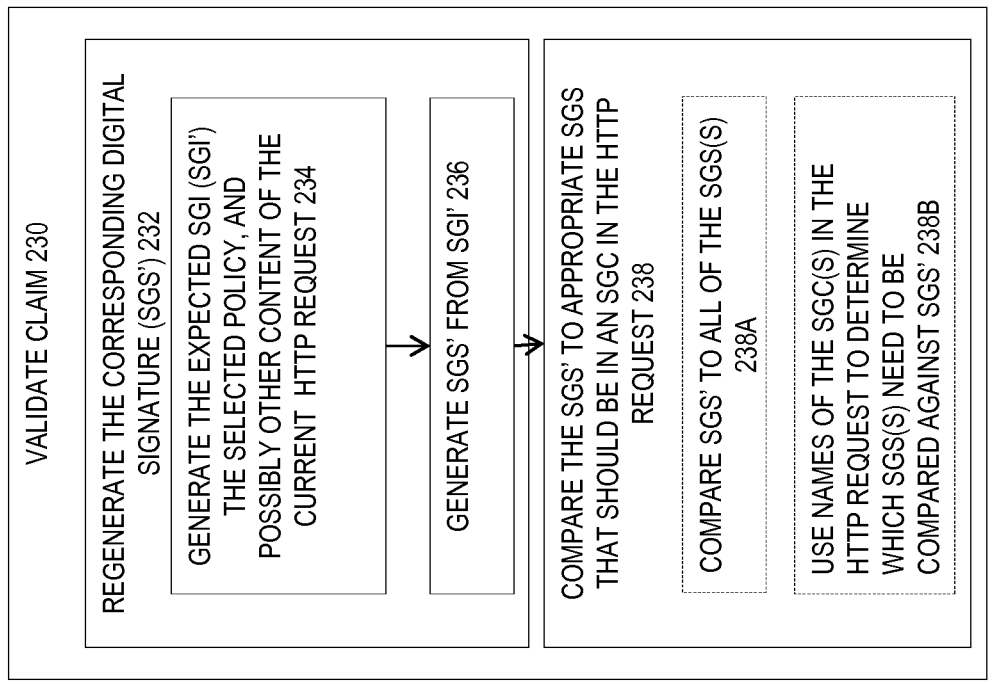
FIG. 2B is a flow diagram illustrating a manner of performing block 230 of FIG. 2A according to certain embodiments of the invention.

FIG. 2B is a flow diagram illustrating a manner of performing block 230 of FIG. 2A according to certain embodiments of the invention. FIG. 2B includes two major blocks: block 232 in which the corresponding digital signature (SGS') is regenerated, which is followed by block 238 in which the regenerated corresponding digital signature SGS' is compared to the appropriate SGS that should be in an SGC returned with the HTTP request.

Major block 232 includes sub-blocks 234 and 236. In block 234, the expected SGI (SGI') is generated based on the selected policy, and possibly other content of the current HTTP request. From block 234, flow passes to block 236 in which SGS' is generated from the session nonce and the SGI. Thus, the digital signature (SGS') corresponds to and is expected to match the appropriate SGS that was previously generated.

Major block 238 may be implemented in different ways by different embodiments of the invention. FIG. 2B illustrates two such alternative ways with blocks 238A and 238B. Block 238A illustrates a brute force technique in which the SGS' is compared to all of the SGS(s) returned with the HTTP request. If no match is found, the claim being made in the HTTP request is not valid. However, if a match is found, then the claim is valid.

Block 238B represents an optimization in which a naming convention is used in order to reduce the number of comparisons required in block 238A. In one embodiment of the invention, this naming convention is used to name the SGC(s) when they are generated. When those SGC(s) are returned in a subsequent HTTP request, their names are used to implement this optimization. Thus, in block 238B, the names of the SGC(s) in the HTTP request are used to determine which SGC(s), and thus the SGS(s) contained therein, need to be compared against the SGS'.

While any number of different naming conventions could be used, FIG. 3 is a table illustrating the naming convention used according to certain embodiments of the invention. While the naming convention is illustrated with regard to the previously introduced exemplary attacks, it should be understood that it can be extended to include any number of other types of attacks. The first column of the table is identical to that of the table in FIG. 1B. The header row is respectively: 1) type 151; 2) SGC identifier (optional—allows to find SGC(s) in HTTP messages faster); 3) action (optional—reduce the number of cookies needed to evaluate against a given policy rule); and 4) creation trigger information from policy (optional). The action column represents one manner of implementing the optimization described with reference to block 238B from FIG. 2B. Specifically, a character string is used in the naming convention to categorize the cookies by attack type (e.g., read only parameter, forceful browsing, and cookie poisoning). The "SGC identifier" is an additional optional optimization to allow for the SGC(s) to be distinguished from other HTTP cookies more quickly. As such, this is a text string that is expected to be unique to the cryptographically signed HTTP cookies described herein as opposed to other HTTP cookies.

The purpose of including the "creation trigger information from the policy" in the naming convention is somewhat attack type dependent. For instance, in the case of parameter tampering 152, the "creation trigger information from the policy" added to the cookie name may be the name of the parameter and/or a digest of the URL (which can be a wildcard*), and its inclusion can be used to further reduce the number of cookies that need to be evaluated against a given policy rule (that is, be used in conjunction with or separately from the "action" column information to implement block 238B of FIG. 2B). While different information is used for the "creation trigger information" for the forceful browsing 153 (a digest of the prerequisite URL that was accessed), the purpose is the same.

FIG. 2C is a block diagram illustrating a manner of performing block 270 from FIG. 2A according to certain embodiments of the invention. In block 272, the expected global digital signature (GSGS') is regenerated from all of the SGSs in the HTTP request, and control passes to block 274.

As shown in block 274, the regenerated expected global digital signature (GSGS') is compared to the previously generated GSGS that should be returned by the HTTP client as part of the HTTP request, and control passes to block 276.

In block 276, it is determined if the GSGS is valid. If not, control passes to block 278; otherwise, control passes to block 280 in FIG. 2A.

As shown in block 278, the HTTP request is processed according to the failure criteria. Block 278 may be performed in the same or similar manner of previously described block 245 of FIG. 2A. Depending on the outcome of the processing performed in block 278, control may pass from block 278 to block 280 as illustrated by a dashed arrowed line.

Figure 2D:
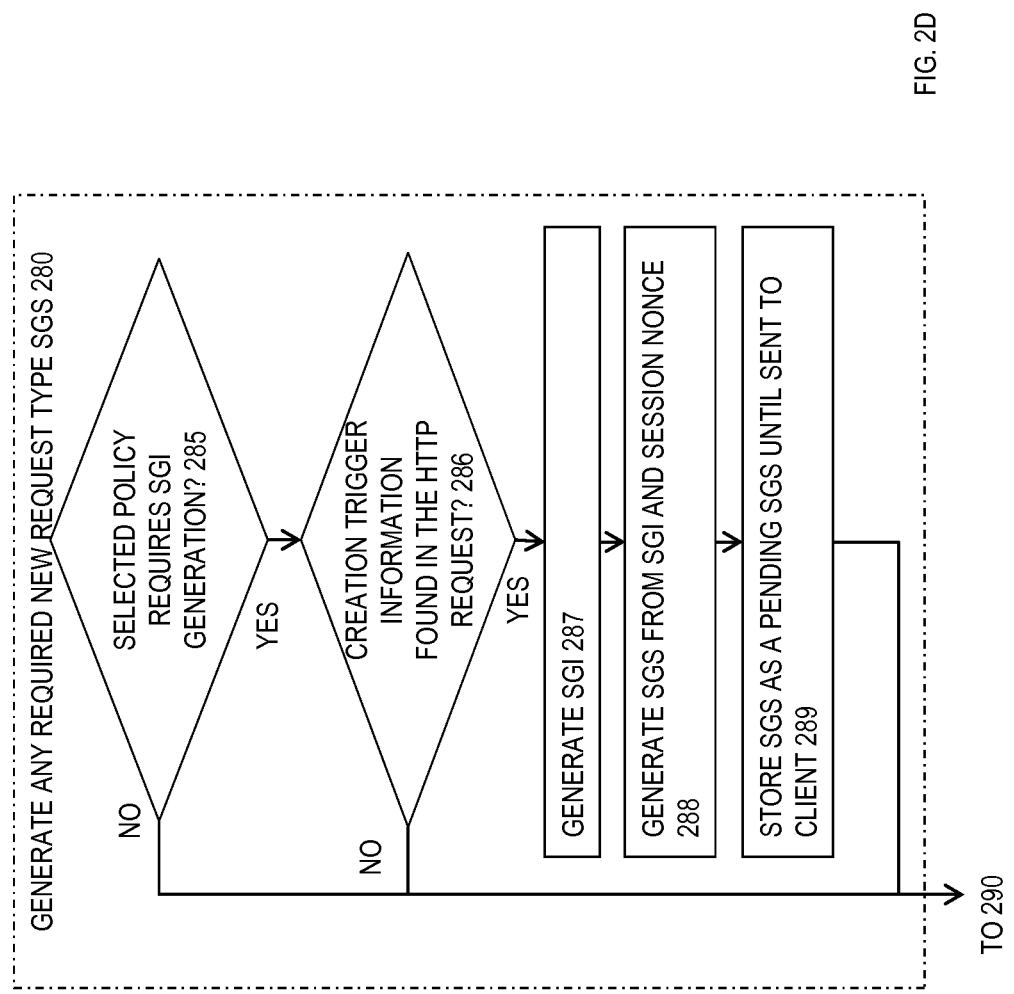
FIG. 2D is a flow diagram illustrating a manner of performing block 280 from FIG. 2A according to certain embodiments of the invention.

FIG. 2D is a flow diagram illustrating a manner of performing block 280 from FIG. 2A according to certain embodiments of the invention. In block 285, it is determined if the selected policy requires SGI generation. If so, control passes to block 286; otherwise, control passes to block 290 from FIG. 2A. Block 285 is performed for similar reasons as block 222; that is, to distinguish policies that do not participate in the described cryptographically signed HTTP cookie process.

As shown in block 286, it is determined if the creation trigger information from the policy is found in the HTTP request. If so, control passes to block 287; otherwise, control passes to block 290.

In block 287, the SGI is generated, and control passes to block 288. In block 288, the SGS is generated from the SGI and the session nonce, and control passes to block 289. In block 289, the SGS is stored as a pending SGS until sent to the HTTP client, and control passes to block 290.

HTTP Response Processing

Having discussed various ways of processing an HTTP request, various ways of processing an HTTP response (e.g., block 170.2 from FIG. 1C) will now be described. As with the processing of HTTP requests, the processing of HTTP responses changes dependent upon whether request type SGI(s)/SGS(s) are supported, response type SGI(s)/SGS(s) are supported, and global digital signatures (GSGS) are supported. In addition, four different ways of processing HTTP responses are described: 1) full buffering (FIGS. 4A-4B); 2) inline insertion (FIG. 4C); 3) forced reference (FIG. 4D); and 4) chunked (FIG. 4E).

Figure 4A:
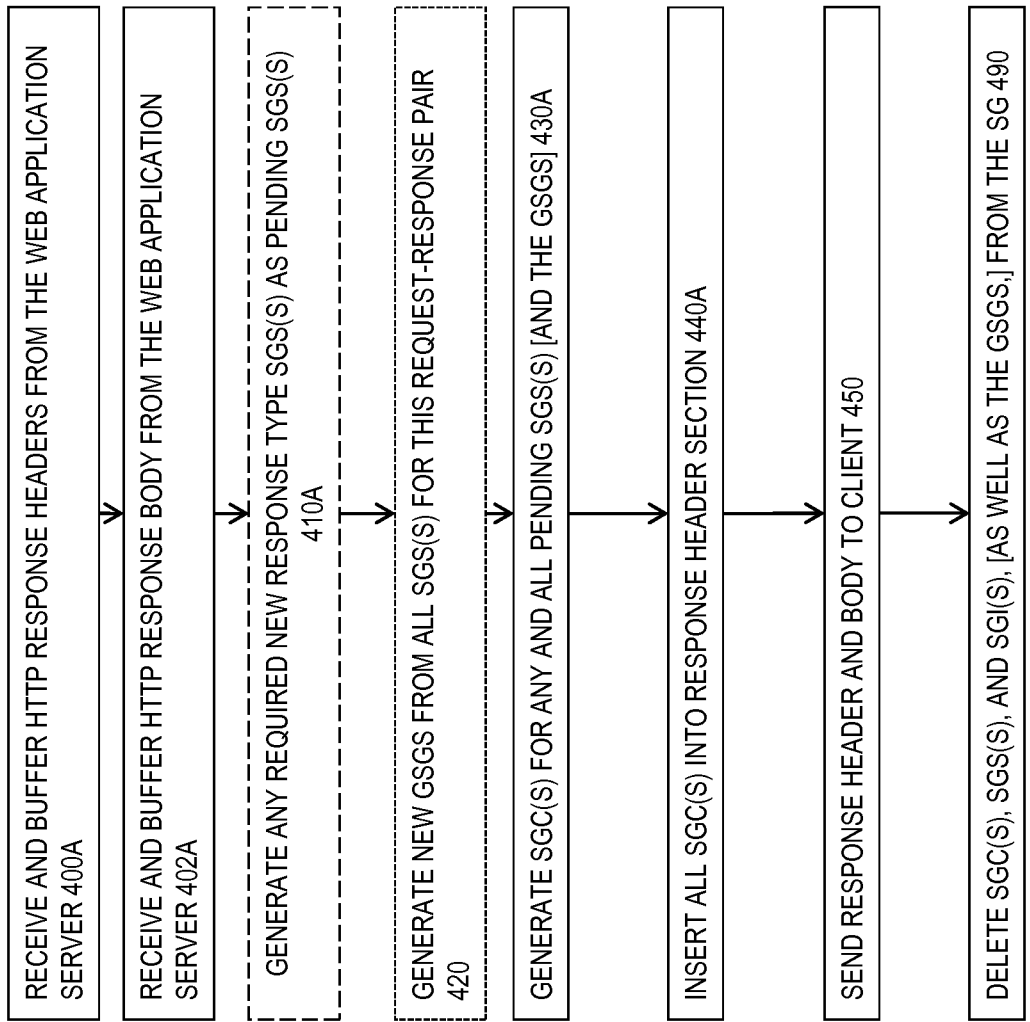
FIG. 4A is a flow diagram illustrating the processing of an HTTP response using a full buffering approach according to certain embodiments of the invention.
Figure 4B:
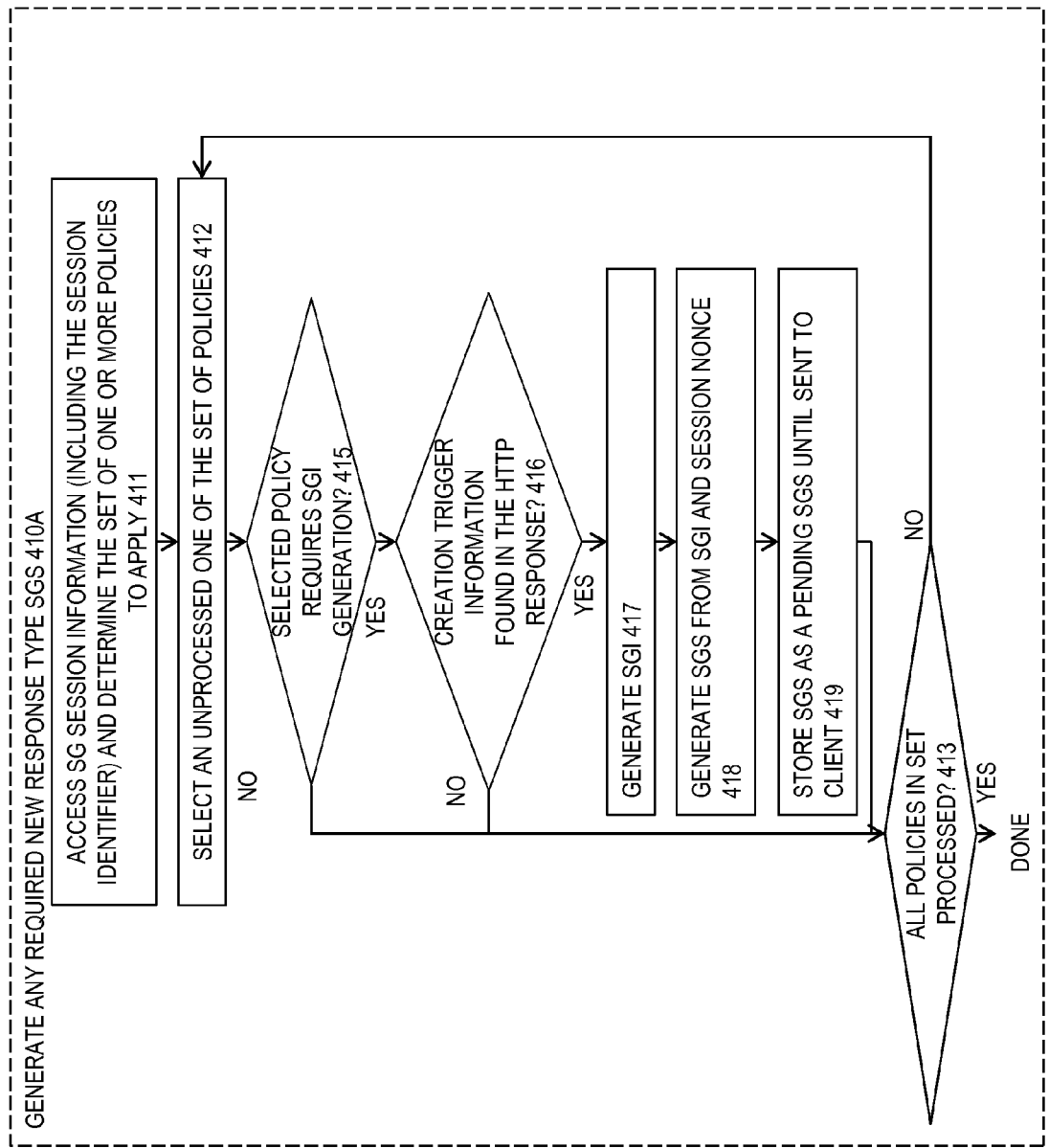
FIG. 4B is a flow diagram illustrating a manner of performing block 410A from FIG. 4A according to certain embodiments of the invention.
Figure 4C:
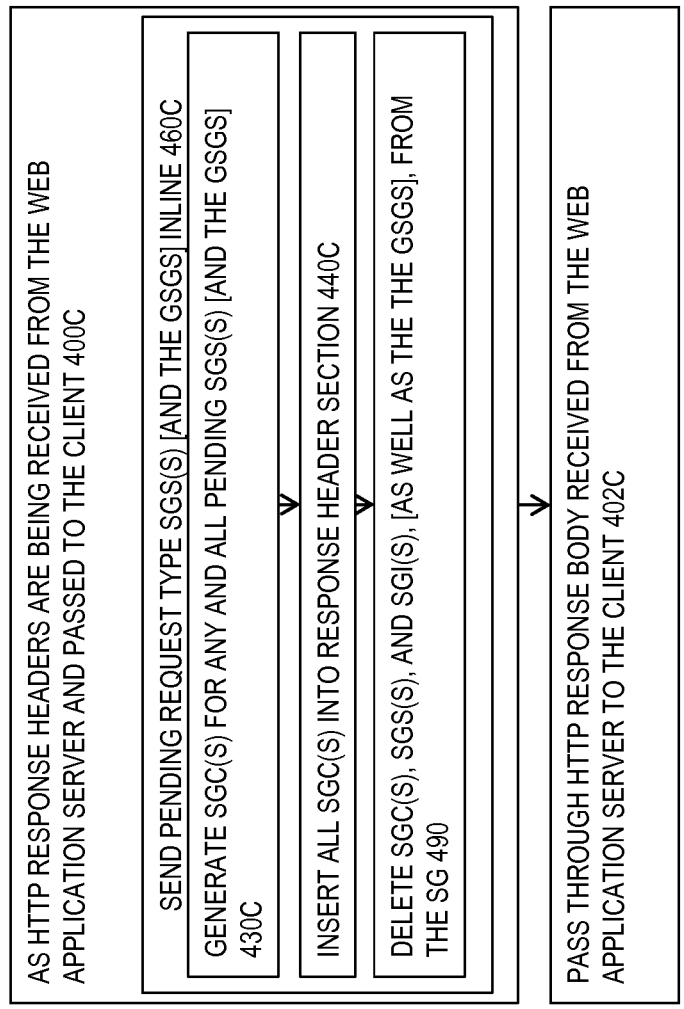
FIG. 4C is a flow diagram illustrating an inline insertion approach to processing HTTP responses according to certain embodiments of the invention.
Figure 4D:
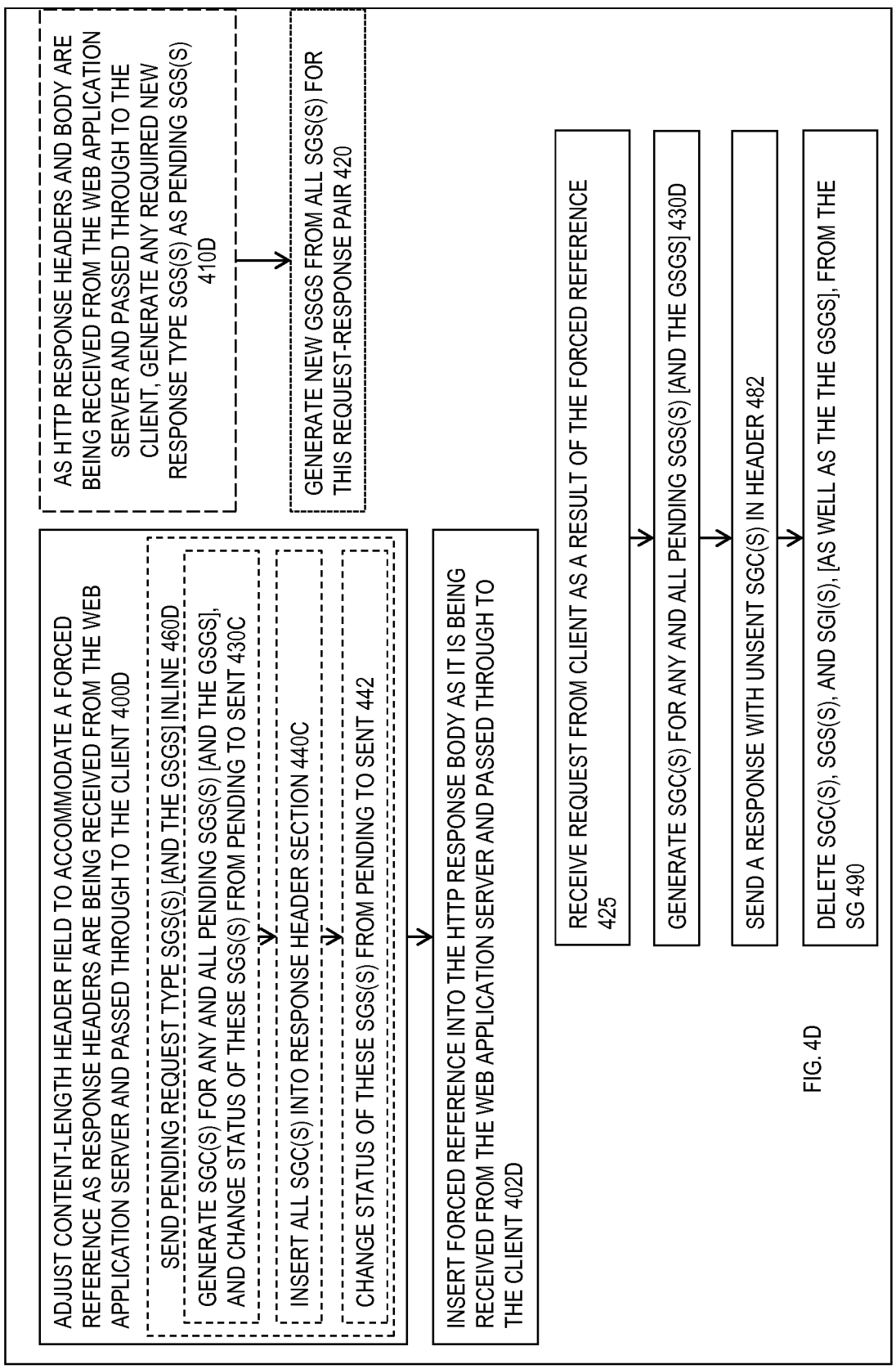
FIG. 4D is a flow diagram illustrating a forced reference approach to processing HTTP responses according to certain embodiments of the invention.
Figure 4E:
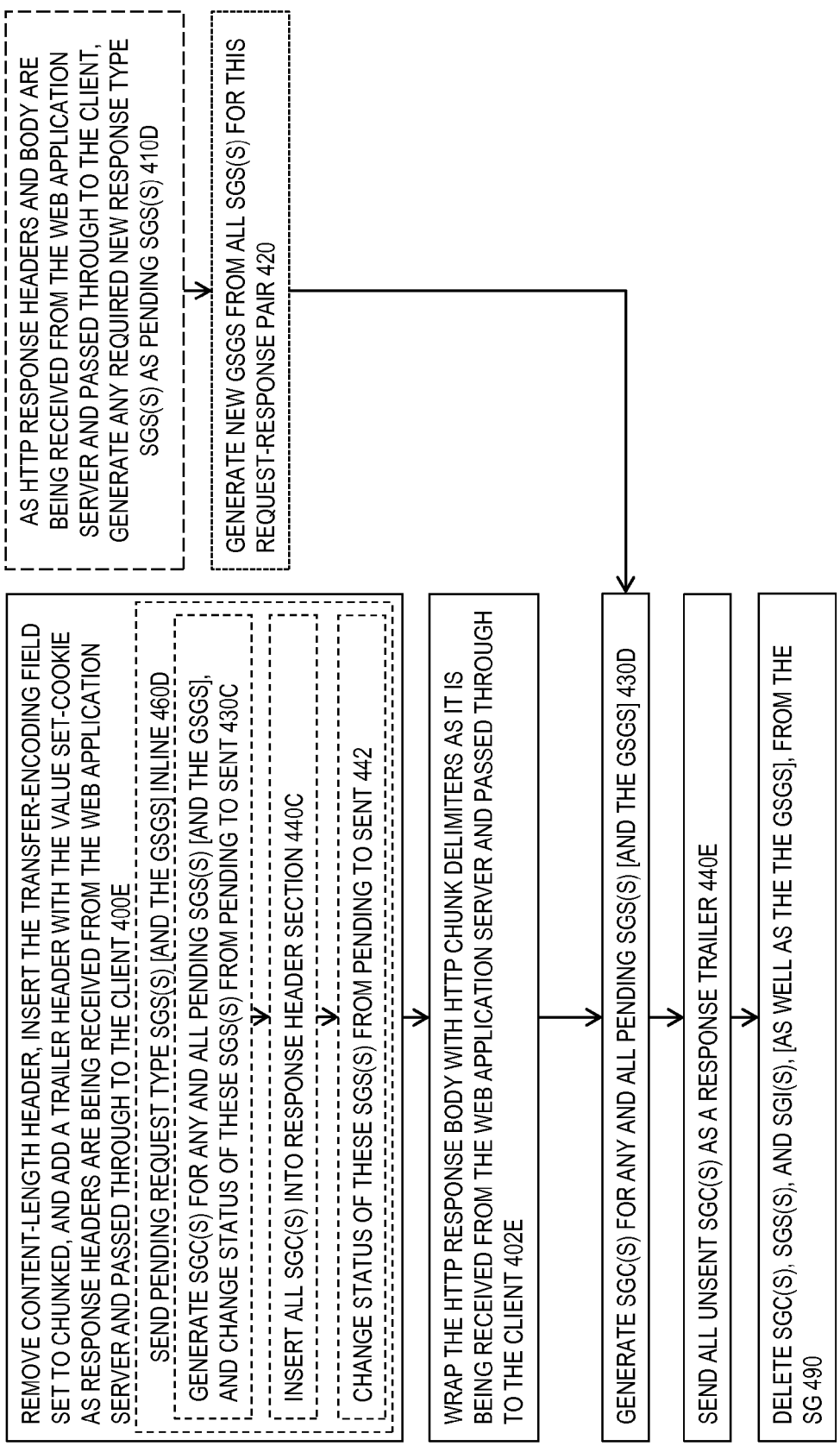
FIG. 4E is a flow diagram illustrating a chunked approach to processing HTTP responses according to certain embodiments of the invention.

The below table puts the above together to illustrate the different approaches and optional feature combinations according to certain embodiments of the invention:

| Manner of Processing | Shorthand | Features |
| --- | --- | --- |
| Full buffering illustrated in FIGS. 4A and 4B | 1 | Optionally support request type SGI(s)/SGS(s), response type SGI(s)/SGS(s), and GSGS(s). |
| Inline insertion illustrated in FIG. 4C | 2 | Optionally support request type SGI(s)/SGS(s) and GSGS(s), but not response type SGI(s)/SGS(s). |
| Forced reference illustrated in FIG. 4D | 3 | Optionally support request type SGI(s)/SGS(s) inline, request type SGI(s)/SGS(s) as pending until the request triggered by the forced reference, response type SGI(s)/SGS(s), and GSGS(s). |
| Chunked as illustrated in FIG. 4E | 4 | Optionally support request type SGI(s)/SGS(s) inline, request type SGI(s)/SGS(s) in the response trailer, response type SGI(s)/SGS(s), and GSGS(s). |

Full Buffering

FIG. 4A is a flow diagram illustrating the processing of an HTTP response using a full buffering approach according to certain embodiments of the invention. In block 400A, the HTTP response headers are received from the web application server and buffered. From block 400A control passes to block 402A. As shown in block 402A, the HTTP response body is received from the web application server and buffered. From block 402A, control passes to block 410A.

Dashed block 410A pertains to optionally supported response type SGI(s)/SGS(s). In block 410A any required new response type SGI(s)/SGS(s) are generated and stored as pending. A manner of performing block 410A according to certain embodiment of the invention is described later herein with reference to FIG. 4B. From block 410A, control passes to block 420.

As shown in dashed block 420, a new GSGS is generated from all of the SGS(s) for this request-response pair, and control passes to block 430A. Block 420 pertains to the optionally supported global digital signatures (GSGS(s)). The term "request-response pair" refers to SGS(s) that may have been generated responsive to the preceding HTTP request (request type SGI(s)/SGS(s)) and any newly created response type SGS(s) pursuant to block 410A.

In block 430A, SGC(s) are generated for any and all pending SGS(s) [and the GSGS], and control passes to block 440A. As before, the bracketed text pertains to an optional feature, and in this case the optionally supported feature of global digital signatures.

As shown in block 440A, all of the SGC(s) are inserted into the response header section of the buffered HTTP response, and control passes to block 450. As shown in block 450 the buffered, modified HTTP response header and the buffered HTTP response body are transmitted to the HTTP client. From block 450, control passes to block 490. In block 490, any SGC(s), SGS(s) and SGI(s), [as well as the GSGS,] are deleted from the security gateway. Block 490 may be performed because this information need no longer be temporarily stored by the security gateway because the SGCs have now been stored in the cookie store of the HTTP client.

It should be understood that the blocks in FIG. 4A, and other flow diagrams herein, need not all be performed sequentially as sometimes illustrated. For instance, block 410A may be performed while blocks 400A and 402A are being performed.

FIG. 4B is a flow diagram illustrating a manner of performing block 410A from FIG. 4A according to certain embodiments of the invention. It is worth noting that the process illustrated in FIG. 4B for generating response type SGS(s) is similar to the process for generating request type SGS(s) illustrated in FIGS. 2A and 2D.

In block 411, the SG session information (including the session identifier) is accessed and used to determine the set of one or more policies to apply. Block 411 is performed in a similar manner as block 210 from FIG. 2A. From block 411, control passes to block 412.

As shown in block 412, an unprocessed one of the set of policies is selected, and control passes to block 415. Block 412 is performed in a similar manner to block 215 from FIG. 2A.

In block 415, it is determined if the selected policy requires SGI generation. If so, flow passes to block 416; otherwise, flow passes to block 413. The manner of performing block 415 is similar to block 285 from FIG. 2D.

In block 416, it is determined if the creation trigger information is found in the HTTP response. If so, control passes to block 417; otherwise, control passes to block 413. Block 416 is performed in a similar manner as block 286 from FIG. 2D, except in block 416 the HTTP response is searched for the creation trigger information rather than the HTTP request.

If the creation trigger information is found in block 416, then an SGI is generated (block 417), an SGS is generated from the SGI and session nonce (block 418), and the SGS is stored as a pending SGS until sent to the HTTP client (block 419). Blocks 417, 418, and 419 are performed in a similar manner to blocks 287, 288, and 289 from FIG. 2D, respectively. From block 419, control passes to block 413.

In block 413, it is determined if all of the policies in the set have been processed. If not control passes to block 412; otherwise, block 410A is complete. Block 413 is performed in a similar manner as block 260 from FIG. 2A.

Inline Insertion

FIG. 4C is a flow diagram illustrating an inline insertion approach to processing HTTP responses according to certain embodiments of the invention. FIG. 4C has two main blocks labeled 400C and 402C. Capital letters have been added to labels in FIGS. 4A-D to indicate that these blocks have a relationship, but are performed in a different way (e.g., blocks 400A and 400C). Specifically, while in block 400A of FIG. 4A the HTTP response headers are buffered until the entire HTTP message is ready to be sent in block 450, block 400C is performed as the response headers are being received from the web application server and passed through to the HTTP client.

Major block 400C includes sub-block 460C. In block 460C, any pending request type SGS(s) [and the GSGS] are sent inline (that is, they are inserted among the response headers as the response headers are being passed through the security gateway).

Within block 460C, there are three sub-blocks. The first sub-block is 430C, and is performed in the same manner as block 430A from FIG. 4A with the exception that there will not be any pending response type SGS(s). From block 430A, control passes to block 440C.

Block 440C is similar to block 440A from FIG. 4A in that all of the SGC(s) are inserted into the response header section, and control passes to block 490. Block 440C differs from block 440A in that block 440A inserts SGC(s) into the buffered response header section, whereas the SGC(s) are inserted inline in block 440C.

Block 490 is performed in the same manner as block 490 from FIG. 4A.

Control passes from block 400C to 402C. In block 402C, the HTTP response body received from the web application server is passed through to the HTTP client as it is received.

The inline insertion approach illustrated in FIG. 4C has the advantage of avoiding buffering the entire HTTP response. As described later herein with reference to block 460D, the inline insertion approach may optionally be used in conjunction with the forced reference and chunked approaches.

Forced Reference

FIG. 4D is a flow diagram illustrating a forced reference approach to processing HTTP responses according to certain embodiments of the invention. FIG. 4D includes two flow diagrams performed in parallel when the HTTP response is processed, and a third flow performed when the HTTP response message causes the HTTP client to make an additional request to the security gateway as a result of a forced reference.

The first flow diagram starts with block 400D. Similar to blocks 400A and 400C, block 400D pertains to the receipt of the HTTP header section. In block 400D, as the response headers are being received from the web application server and passed through to the HTTP client, the content length header field is adjusted to accommodate the insertion of a forced reference in the HTTP response body. This is made possible since the size of the forced reference is constant regardless of the size and amount of SGC(s). From block 400D, control passes to block 402D.

In block 402D, the forced reference is inserted into the HTTP response body as it is being received from the web application server and passed through to the HTTP client. The forced reference can take the form of an <img> tag (e.g., with a single pixel size), a "<script>" tag, any other non-visual HTML element, or any other visual HTML element that would commonly go unnoticed by the user that can accommodate the "src" attribute where the "src" attribute is set to instruct the browser to access a specific URL (referred to here as a "forced reference"). As such, this is a separate communication transaction (an "extra" request and response) from the HTTP response. In order to avoid accidental processing of this "extra" request by the actual web application server (since it need only be processed by the security gateway), the URL is chosen such that it is recognized and processed by the security gateway (the request can either be dropped or relayed to the web application server, but in no case will it be handled by the web application server). Block 402D is similar to block 402C from FIG. 4C, with the exception that in 402D the forced reference is inserted into the HTTP response body.

Returning to block 400D, optional sub-blocks illustrate optional support for the sending of any pending request type SGS(s) [and the GSGS] inline (block 460D). Block 460D is similar to block to 460C in that it includes sub-blocks 430C and 440C. However, in block 460D control passes from block 440C to block 442, and block 490 is not present. The pending SGS(s) for which the SGC(s) were generated (block 430C) and inserted into the response header section (block 440C) had a status of pending, and in block 442 that status is changed to sent. Block 442 is performed only in embodiments which support a GSGS and the sending of request type SGS(s) inline. It is performed in this manner because these SGS(s) are stored in order for a GSGS to be generated across these SGS(s) and any newly created response type SGS(s). However, since these SGS(s) have already been sent, they do not need to be resent to the HTTP client—the status of sent versus pending is used to avoid the sending of these SGS(s) a second time. Embodiments that support the sending of pending request type SGS(s) inline and do not support global digital signatures may delete these sent SGS(s) in block 442 rather than changing their status to pending.

The second flow diagram begins with dashed block 410D. In block 410D, as the HTTP response headers and body are being received from the web application server and passed through to the client, any required new response type SGS(s) are generated as pending SGS(s), and control passes to block 420. Block 410D is performed in a similar manner to block 410A with the exception that block 410D is performed as the HTTP response is being passed through rather than buffered.

In dashed block 420, a new GSGS is generated by digitally signing all of the SGS(s) for this request-response pair. The SGS(s) are signed as part of this GSGS regardless of whether their status is pending or sent (in embodiments that perform block 460D).

The third flow diagram begins with block 425. Specifically, when the forced reference inserted in the HTTP response body is processed by the HTTP client, the HTTP client will make a request to the security gateway. In block 425, such a request is received by the security gateway from the HTTP client, and control passes to block 430D. In block 430D, SGC(s) are generated for any and all pending SGS(s) [and the GSGS]. It is worthwhile to note that where block 460D was performed, the sent SGS(s) would not be included. From block 430D, control passes to block 482. In block 482, a response to the forced reference request is sent to the HTTP client. This response includes the unsent SGC(s) in the header. From block 482, control passes to block 490.

The forced reference approach illustrated in FIG. 4D has the advantage of avoiding buffering the entire HTTP response, and also being capable of supporting response type SGI(s)\SGS(s).

Chunked

FIG. 4E is a flow diagram illustrating a chunked approach to processing HTTP responses according to certain embodiments of the invention. The flow diagram in FIG. 4E starts in two different locations: block 400E and block 410D.

In block 400E, as the response headers are being received from the web application server and passed through to the HTTP client, the content length header is removed, a transfer encoding field set to chunked is inserted, and a trailer header with the value set-cookie is added. From block 400E, control passes to block 402E. In addition, block 400E includes the same optional block 460D (and its sub-blocks) from FIG. 4D to illustrate the same feature may be optionally supported by certain embodiments of the invention.

In block 402E, the HTTP response body is wrapped with HTTP chunk delimiters as it is being received from the web application server and passed through to the HTTP client. From block 402E, control passes to block 430D.

The flow starting with block 410D passes to optional block 420, and then on to block 430D.

From block 430D, control passes to block 440E. In block 440E, all unsent SGC(s) are sent as part of the response trailer. From block 440E, control passes to block 490.

The chunked approach illustrated in FIG. 4E has the advantage of avoiding buffering the entire HTTP response, supporting response type SGI(s)\SGS(s), and avoiding a forced reference request (and thus another request and response transaction).

Exemplary Implementations

Figure 5:
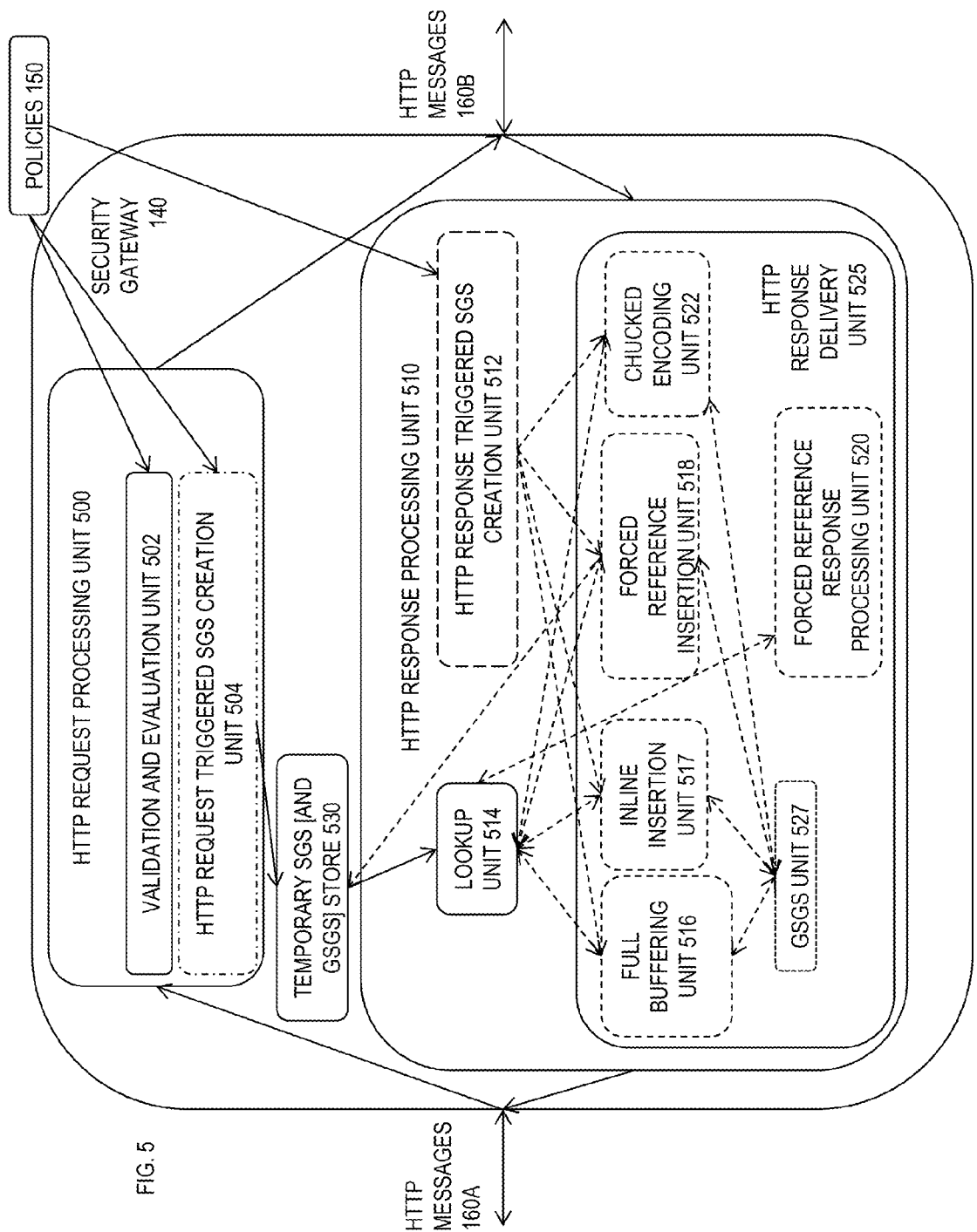
FIG. 5 is a block diagram illustrating a security gateway according to certain embodiments of the invention.

FIG. 5 is a block diagram illustrating a security gateway according to certain embodiments of the invention. In FIG. 5, those of the HTTP messages 160A that are incoming HTTP request messages are received by the security gateway 140 and provided to an HTTP request processing unit 500, which performs the flow in FIG. 2A. The HTTP request processing unit 500 includes a validation and evaluation unit 502 (which performs blocks 230 and 280 from FIGS. 2A, 2B, and 2C) and optionally an HTTP request triggered SGS creation unit 504 (which performs the flow in FIG. 2D). Both of these units have at least read access to the policies 150. The HTTP request triggered SGS creation unit 504 stores request type SGS(s) [and GSGS(s)] in a temporary SGS [and GSGS] store 530. The processed HTTP request messages that are to be sent to the web application server are sent as part of the HTTP messages 160B.

Those of the HTTP messages 160B that are HTTP response messages from the web application server are received by the security gateway 140 and provided to an HTTP response processing unit 510. The HTTP response processing unit 510 includes an HTTP response delivery unit 525 which is responsible for transmitting those of the HTTP messages 160A that are the HTTP responses modified as necessary to accommodate the cryptographically signed HTTP cookies described herein to the HTTP client. Since there are a variety of ways of implementing the HTTP response delivery unit 525, dashed boxes are used to illustrate the various techniques already described herein: 1) full buffering by full buffering unit 516 (which would perform either the flow diagram illustrated in FIG. 4A-4B); 2) inline insertion by the inline insertion unit 517 (performs the flow diagram illustrated in FIG. 4C); 3) forced reference by a forced reference insertion unit 518 (which would perform the first two flow diagrams illustrated in FIG. 4D) and a forced reference response processing unit 520 (which would perform the third flow diagram illustrated in FIG. 4D); and 4) chunked performed by a chunked encoding unit 522 (which would perform the flow illustrated in FIG. 4E).

The HTTP response processing unit 510 also includes a lookup unit 514 to read selected one of the SGS(s) [and GSGS(s)] in the temporary SGS store 530 based on the session identifier. As such, each of the units 516, 517, 518, and 522 are illustrated as optionally having bidirectional connections to the GSGS unit 527. In addition, the HTTP response processing unit 510 also optionally includes an HTTP response trigger SGS creation unit 512 which has at least read access to the policies 150, which searches for creation trigger information in the HTTP responses, and creates corresponding SGS(s) for transmission to the HTTP client. In one embodiment of the invention, such response type SGS(s) are provided to the one of the delivery units being used by the HTTP response delivery unit 525. In addition, the forced reference insertion unit 518 may optionally place response type SGS(s) into the temporary SGS store 530, to which the forced reference response processing unit 520 has read access.

Further the HTTP response delivery unit 525 also optionally includes a GSGS unit 527 for digitally signing the group of SGS(s) to be transmitted to the HTTP client to create a global digital signature (GSGS). As such, each of the units 516, 517, 518, and 522 are illustrated as optionally having bidirectional connections to the GSGS unit 527.

Exemplary Deployments

FIG. 6 illustrates exemplary deployment environments of the security gateway according to certain embodiments of the invention. Specifically, FIG. 6 illustrates multiple HTTP clients residing on multiple client end stations (where the first of these is labeled 605A and includes HTTP client 110A).

The policies 150 are shown to be hosted in a management server 660 to which the security gateway 140 has at least read access. The security gateway 140 is illustrated as being in between the client end stations and the data center 620. The data center 620 includes server hardware 625 on which is executing multiple web application servers (the first of which is labeled 130A). The client end stations 605 represent client end stations that are accessing one of the web application servers 130A, and thus are accessing through a web interface. Such client end stations 605 may be outside of the private network of which the security gateway 140 and data center 620 are a part, or within that private network.

As previously described, the security gateway 140 may be deployed in a variety of ways. FIG. 6 illustrates three different deployments in which the security gateway 140 is implemented as a separate network device from the server hardware 625. The five options are as follows: 1) an inline transparent bridge or layer 3 router 140A in front of a switch 645; 2) a non-inline sniffer 140B which is connected to a switch 645 that sits between the client end stations and the data center; and 3) a reverse proxy or transparent proxy 140C which is connected to a switch 645 that sits between the client end stations and the data center.

Alternative Embodiments

For example, the operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

As another example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a security gateway (SG), coupled between a hypertext transport protocol (HTTP) client and a web application server, for detecting web attacks, the method comprising:

responsive to a first HTTP message being transmitted between the HTTP client and the web application server as part of an HTTP session, generating security gateway session security state information (SGI) based on a policy and the first HTTP message;

generating a digital signature (SGS) from the SGI;

creating an SG signed session security state information cookie (SGC) that includes the SGS and not the SGI;

sending the SGC to the HTTP client for storage instead of storing the SGI in the SG, wherein the HTTP client should return the SGC as part of a next HTTP request transmitted from the HTTP client to the web application server as part of the HTTP session; and responsive to a second HTTP message being transmitted from the HTTP client to the web application server as part of the HTTP session, attempting to validate a claim made in the second HTTP message using at least the policy and the SGC that is supposed to be returned with the next HTTP request.

2. The method of claim 1, wherein:

the method further includes generating a global digital signature (GSGS) from the SGS and other SGSs to be sent to the HTTP client;

the sending further includes sending the GSGS to the HTTP client for storage in one of the same SGC or a different SGC; and the attempting to validate further includes attempting to validate any SGSs returned with the second HTTP message using the GSGS that is supposed to be returned with the second HTTP message.

3. The method of claim 2, wherein the attempting to validate any SGSs further includes:

generating an expected global digital signature (GSGS') from the SGSs; and comparing the GSGS' to the GSGS.

4. The method of claim 1, wherein the first HTTP message is an HTTP request message and the SGI is a request type SGI.

5. The method of claim 1, wherein the first HTTP message is an HTTP response message and the SGI is a response type SGI.

6. The method of claim 1, wherein the policy is for detecting a parameter tampering attack.

7. The method of claim 6, wherein the SGI includes a name of a parameter and a first read only value for the parameter identified by the web application server in the first HTTP message, and the claim in the second HTTP message is that the parameter with the name has a second value, wherein the first and second value are the same if the parameter has not been tampered with.

8. The method of claim 1, wherein the policy is for detecting a forceful browsing attack.

9. The method of claim 8, wherein the SGI includes a prerequisite URL identified by the HTTP client in the first HTTP message, and the claim in the second HTTP message is a URL requiring a prerequisite, wherein the perquisite is that the prerequisite URL was previously visited during the HTTP session.

10. The method of claim 1, wherein the policy is for detecting a cookie poisoning attack.

11. The method of claim 10, wherein the SGI includes a name for a web application cookie and a first value for the web application cookie identified by the HTTP client in the first HTTP message, and the claim in the second HTTP message is that the web application cookie has a second value, wherein the first and second value are the same if the web application cookie has not been tampered with.

12. The method of claim 1, wherein the policy includes creation trigger information that when present in the first HTTP message causes the generating the SGI and the generating the SGS, and wherein the policy includes regeneration trigger information that when present in the second HTTP message causes the attempting to validate.

13. The method of claim 1, wherein the attempting to validate the claim includes:
generating an expected security gateway session security state information (SGI');
generating an expected digital signature (SGS') from the SGI'; and
comparing the SGS' to the SGS.

14. The method of claim 1, wherein the sending the SGC to the HTTP client includes:
inserting the SGC into the first HTTP message; and
sending the first HTTP message to the HTTP client.

15. The method of claim 1, wherein the sending the SGC to the HTTP client includes:
inserting the SGC into a third HTTP message; and
sending the third HTTP message to the HTTP client.

16. The method of claim 1, wherein the sending the SGC to the HTTP client includes:
receiving a forced reference request from the HTTP client for the SGC; and
sending the SGC to the HTTP client.

17. A method in a security gateway (SG) for detecting web attacks, wherein the SG is coupled between a plurality of hypertext transport protocol (HTTP) clients and a set of one or more web application servers, wherein each of the plurality of HTTP clients has with one of the set of web application servers a web application session that involves the exchange of HTTP messages, wherein each of the set of web application servers stores web application session state information for each of its web application sessions, the method comprising:
responsive to the exchange of HTTP messages, performing the following:
distributively storing in the HTTP clients digital signatures (SGSs) generated by the SG to validate claims that may be made in HTTP requests subsequently transmitted by the HTTP clients to the set of web application servers as part of the web application sessions, wherein the distributively storing comprises:
generating pieces of SG session security state information (SGIs) based on polices and based on certain of the web application session state information the SG can derive from the HTTP messages currently being exchanged;
generating a digital signatures (SGSs) from the SGIs;
transmitting to the HTTP clients their respective SGSs in HTTP cookies (SGCs);
checking for web attacks in those of the HTTP messages that are HTTP requests with information that implicitly claims that the HTTP request conforms with the policies, wherein the checking comprises:
attempting to validate any such claims in each of the HTTP requests based on the policies and any of the SGCs returned with that HTTP request; and
processing according to failure criteria any of the HTTP requests that fail the attempted validation.

18. The method of claim 17, wherein the SGIs are generated responsive to HTTP request messages.

19. The method of claim 17, wherein the SGIs are generated responsive to HTTP response messages.

20. The method of claim 17, wherein the policies are for detecting a parameter tampering type of attack.

21. The method of claim 17, wherein the policies are for detecting a forceful browsing type of attack.

22. The method of claim 17, wherein the policies are for detecting a cookie poisoning type of attack.

23. The method of claim 17, wherein the policies include creation trigger information that when present in one of the HTTP messages causes one of the SGSs to be stored in one of the HTTP clients, and wherein the policies include regeneration trigger information that when present in one of the HTTP request messages implicitly claims that the HTTP request conforms with the policy.

24. The method of claim 17, wherein the attempting to validate includes:
generating an expected security gateway session security state information (SGI');
generating an expected digital signature (SGS') from the SGI'; and
comparing the SGS' one of the returned SGSs.

25. The method of claim 17, wherein the transmitting to the HTTP clients their respective SGSs in HTTP cookies (SGCs) includes:
inserting the SGCs into HTTP response ones of the HTTP messages.

26. The method of claim 25, wherein the inserting includes fully buffering the HTTP responses before sending them to their respective HTTP clients.

27. The method of claim 25, wherein the inserting is performed as the HTTP responses are being passed through without being fully buffered.

28. The method of claim 25, wherein the inserting includes inserting the SGCs into response headers of the HTTP responses.

29. The method of claim 25, wherein the inserting includes inserting the SGCs into response trailers of the HTTP responses.

30. The method of claim 17, wherein the transmitting to the HTTP clients their respective SGSs in HTTP cookies (SGCs) includes:
receiving forced reference requests from the HTTP clients for their respective SGCs; and
sending the SGCs to the HTTP clients accordingly.

31. An apparatus comprising:
an electronic device including:
a security gateway (SG) to detect web attacks in a web application session between a hypertext transport protocol (HTTP) client and a web application server, the security gateway to be coupled to receive HTTP messages being transmitted between the HTTP client and the web application server as part of the web application session, and the security gateway to be coupled to receive a policy that includes information including regeneration trigger information, wherein the security gateway is configured to receive an HTTP response one of the HTTP messages transmitted by the web application server, and configured to transmit a modified version of this HTTP response message to the HTTP client, wherein the modification results in an HTTP cookie that includes a first digital signature being sent by the SG to the HTTP client;

wherein the security gateway is configured to receive an HTTP request one of the HTTP messages transmitted by the HTTP client after the HTTP client has received the HTTP cookie, wherein the HTTP request includes the HTTP cookie and the regeneration trigger information; and wherein generating a second digital signature, in the same manner used to generate the first digital signature, from at least one of part of the HTTP request and part of the information included in the policy yields matching digital signatures or different digital signatures respectively depending on whether a web attack has occurred.

32. The electronic device of claim 31, wherein the modification also results in a third digital signature being sent by the SG to the HTTP client, the third digital signature being generated from the first digital signature and other digital signatures, wherein the HTTP request also includes the third digital signature, and wherein generating a fourth digital signature, in the same manner used to generate the third digital signature, from any and all of the first digital signature and the other digital signatures included in the HTTP request yields matching digital signatures or different digital signatures respectively depending on whether a web attack has occurred.

33. The electronic device of claim 31, wherein the modification the HTTP cookie in the HTTP response message.

34. The electronic device of claim 31, wherein the modification in the HTTP cookie in the header section of the HTTP response message.

35. The electronic device of claim 31, wherein the modification is the HTTP cookie in a response trailer of the HTTP response message.

36. The electronic device of claim 31, wherein the modification is a forced reference in a body section of the HTTP response message, wherein the forced reference will cause the HTTP client to request the HTTP cookie.

37. The electronic device of claim 31, wherein the policy is for detecting a parameter tampering attack.

38. The electronic device of claim 31, wherein the policy is for detecting a forceful browsing attack.

39. The electronic device of claim 31, wherein the policy is for detecting a cookie poisoning attack.

40. The electronic device of claim 31, wherein the policy also includes creation trigger information that is also in the HTTP response.

41. The electronic device of claim 31, wherein the policy also includes creation trigger information and wherein the SG is also configured to receive an earlier HTTP response that includes the creation trigger information.

42. The apparatus of claim 31, wherein the electronic device is coupled to a client end station executing the HTTP client and is also coupled to server hardware executing the web application server.

43. The apparatus of claim 42, wherein the electronic device is also coupled to a management server having stored therein the policy.

44. A non-transitory computer-readable storage media storing code, which when executed by a set of one or more processors, cause the set of one or more processors to implement a security gateway (SG) to perform operations comprising:

responsive to a first HTTP message being transmitted between a hypertext transport protocol (HTTP) client and a web application server as part of an HTTP session, generating security gateway session security state information (SGI) based on a policy and the first HTTP message;

generating a digital signature (SGS) from the SGI;

creating an SG signed session security state information cookie (SGC) that includes the SGS and not the SGI;

sending the SGC to the HTTP client for storage instead of storing the SGI in the SG, wherein the HTTP client should return the SGC as part of a next HTTP request transmitted from the HTTP client to the web application server as part of the HTTP session; and responsive to a second HTTP message being transmitted from the HTTP client to the web application server as part of the HTTP session, attempting to validate a claim made in the second HTTP message using at least the policy and the SGC that is supposed to be returned with the next HTTP request.

45. The non-transitory computer-readable storage media of claim 44, wherein:

the operations further include generating a global digital signature (GSGS) from the SGS and other SGSs to be sent to the HTTP client;

the sending further includes sending the GSGS to the HTTP client for storage in one of the same SGC or a different SGC; and the attempting to validate further includes attempting to validate any SGSs returned with the second HTTP message using the GSGS that is supposed to be returned with the second HTTP message.

46. The non-transitory computer-readable storage media of claim 45, wherein the attempting to validate any SGSs further includes:

generating an expected global digital signature (GSGS') from the SGSs; and comparing the GSGS' to the GSGS.

47. The non-transitory computer-readable storage media of claim 44, wherein the first HTTP message is an HTTP request message and the SGI is a request type SGI.

48. The non-transitory computer-readable storage media of claim 44, wherein the first HTTP message is an HTTP response message and the SGI is a response type SGI.

49. The non-transitory computer-readable storage media of claim 44, wherein the policy is for detecting a parameter tampering attack.

50. The non-transitory computer-readable storage media of claim 49, wherein the SGI includes a name of a parameter and a first read only value for the parameter identified by the web application server in the first HTTP message, and the claim in the second HTTP message is that the parameter with the name has a second value, wherein the first and second value are the same if the parameter has not been tampered with.

51. The non-transitory computer-readable storage media of claim 44, wherein the policy is for detecting a forceful browsing attack.

52. The non-transitory computer-readable storage media of claim 51, wherein the SGI includes a prerequisite URL identified by the HTTP client in the first HTTP message, and the claim in the second HTTP message is a URL requiring a prerequisite, wherein the perquisite is that the prerequisite URL was previously visited during the HTTP session.

53. The non-transitory computer-readable storage media of claim 44, wherein the policy is for detecting a cookie poisoning attack.

54. The method of claim 53, wherein the SGI includes a name for a web application cookie and a first value for the web application cookie identified by the HTTP client in the first HTTP message, and the claim in the second HTTP message is that the web application cookie has a second value, wherein the first and second value are the same if the web application cookie has not been tampered with.

55. The non-transitory computer-readable storage media of claim 44, wherein the policy includes creation trigger information that when present in the first HTTP message causes the generating the SGI and the generating the SGS, and wherein the policy includes regeneration trigger information that when present in the second HTTP message causes the attempting to validate.

56. The non-transitory computer-readable storage media of claim 44, wherein the attempting to validate the claim includes:
    generating an expected security gateway session security state information (SGI');
    generating an expected digital signature (SGS') from the SGI'; and
    comparing the SGS' to the SGS.

57. The non-transitory computer-readable storage media of claim 44, wherein the sending the SGC to the HTTP client includes:
    inserting the SGC into the first HTTP message; and
    sending the first HTTP message to the HTTP client.

58. The non-transitory computer-readable storage media of claim 44, wherein the sending the SGC to the HTTP client includes:
    inserting the SGC into a third HTTP message; and
    sending the third HTTP message to the HTTP client.

59. The non-transitory computer-readable storage media of claim 44, wherein the sending the SGC to the HTTP client includes:
    receiving a forced reference request from the HTTP client for the SGC; and
    sending the SGC to the HTTP client.

60. A non-transitory computer-readable storage media storing code, which when executed by a set of one or more processors, cause the set of one or more processors to implement a security gateway (SG) coupled between a plurality of hypertext transport protocol (HTTP) clients and a set of one or more web application servers, wherein each of the plurality of HTTP clients has with one of the set of web application servers a web application session that involves the exchange of HTTP messages, wherein each of the set of web application servers stores web application session state information for each of its web application sessions, the SG to perform operations comprising:
    responsive to the exchange of HTTP messages, performing the following:
        distributively storing in the HTTP clients digital signatures (SGSs) generated by the SG to validate claims that may be made in HTTP requests subsequently transmitted by the HTTP clients to the set of web application servers as part of the web application sessions, wherein the distributively storing comprises:
            generating pieces of SG session security state information (SGIs) based on polices and based on certain of the web application session state information the SG can derive from the HTTP messages currently being exchanged;
            generating a digital signatures (SGSs) from the SGIs;
            transmitting to the HTTP clients their respective SGSs in HTTP cookies (SGCs);
        checking for web attacks in those of the HTTP messages that are HTTP requests with information that implicitly claims that the HTTP request conforms with the policies, wherein the checking comprises:
            attempting to validate any such claims in each of the HTTP requests based on the policies and any of the SGCs returned with that HTTP request; and
            processing according to failure criteria any of the HTTP requests that fail the attempted validation.

61. The non-transitory computer-readable storage media of claim 60, wherein the SGIs are generated responsive to HTTP request messages.

62. The non-transitory computer-readable storage media of claim 60, wherein the SGIs are generated responsive to HTTP response messages.

63. The non-transitory computer-readable storage media of claim 60, wherein the policies are for detecting a parameter tampering type of attack.

64. The non-transitory computer-readable storage media of claim 60, wherein the policies are for detecting a forceful browsing type of attack.

65. The non-transitory computer-readable storage media of claim 60, wherein the policies are for detecting a cookie poisoning type of attack.

66. The non-transitory computer-readable storage media of claim 60, wherein the policies include creation trigger information that when present in one of the HTTP messages causes one of the SGSs to be stored in one of the HTTP clients, and wherein the policies include regeneration trigger information that when present in one of the HTTP request messages implicitly claims that the HTTP request conforms with the policy.

67. The non-transitory computer-readable storage media of claim 60, wherein the attempting to validate includes:
    generating an expected security gateway session security state information (SGI');
    generating an expected digital signature (SGS') from the SGI'; and
    comparing the SGS' one of the returned SGSs.

68. The non-transitory computer-readable storage media of claim 60, wherein the transmitting to the HTTP clients their respective SGSs in HTTP cookies (SGCs) includes:
    inserting the SGCs into HTTP response ones of the HTTP messages.

69. The non-transitory computer-readable storage media of claim 68, wherein the inserting includes fully buffering the HTTP responses before sending them to their respective HTTP clients.

70. The non-transitory computer-readable storage media of claim 68, wherein the inserting is performed as the HTTP responses are being passed through without being fully buffered.

71. The non-transitory computer-readable storage media of claim 68, wherein the inserting includes inserting the SGCs into response headers of the HTTP responses.

72. The non-transitory computer-readable storage media of claim 68, wherein the inserting includes inserting the SGCs into response trailers of the HTTP responses.

73. The non-transitory computer-readable storage media of claim 60, wherein the transmitting to the HTTP clients their respective SGSs in HTTP cookies (SGCs) includes:
    receiving forced reference requests from the HTTP clients for their respective SGCs; and
    sending the SGCs to the HTTP clients accordingly.

* * * * *